(12) United States Patent
Ding et al.

(10) Patent No.: US 12,309,713 B2
(45) Date of Patent: *May 20, 2025

(54) COMMUNICATION METHOD AND APPARATUS

(71) Applicant: Huawei Technologies Co., Ltd., Shenzhen (CN)

(72) Inventors: Rentian Ding, Shenzhen (CN); Yiru Kuang, Beijing (CN); Li Shen, Shenzhen (CN); Bingguang Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,308

(22) Filed: Apr. 23, 2024

(65) Prior Publication Data
US 2024/0276394 A1    Aug. 15, 2024

Related U.S. Application Data

(63) Continuation of application No. 17/427,477, filed as application No. PCT/CN2020/072808 on Jan. 17, 2020, now Pat. No. 11,997,613.

(30) Foreign Application Priority Data

Feb. 1, 2019    (CN) .......................... 201910104967.7

(51) Int. Cl.
*H04W 52/24*    (2009.01)
*H04L 5/00*    (2006.01)
(Continued)

(52) U.S. Cl.
CPC ......... *H04W 52/243* (2013.01); *H04L 5/0073* (2013.01); *H04W 36/06* (2013.01);
(Continued)

(58) Field of Classification Search
CPC ............... H04W 52/243; H04W 36/06; H04W 72/0453; H04W 72/0473; H04W 72/541; H04W 72/54; H04W 88/06; H04L 5/0073
See application file for complete search history.

(56) References Cited

U.S. PATENT DOCUMENTS

| 2013/0029704 A1 | 1/2013 | Koo et al. |
| 2013/0090142 A1 | 4/2013 | Lee et al. |

(Continued)

FOREIGN PATENT DOCUMENTS

| CN | 102202353 A | 9/2011 |
| CN | 102546074 A | 7/2012 |

(Continued)

OTHER PUBLICATIONS

3GPP TS 36.331 V14.9.0 "3rd Generation Partnership Project; Technical Specification Group Radio Access Network; Evolved Universal Terrestrial Radio Access (E-UTRA); Radio Resource Control (RRC); Protocol specification (Release 14)," Dec. 2018, 773 pages.

*Primary Examiner* — Farid Seyedvosoghi
(74) *Attorney, Agent, or Firm* — Conley Rose, P.C.

(57) ABSTRACT

A communication method includes determining, by a terminal device, first in-device coexistence (IDC) interference adjustment information, where the first IDC interference adjustment information includes frequency bandwidth information, and sending, by the terminal device, the first IDC interference adjustment information to a network device to adjust IDC interference based on the first IDC interference adjustment information.

20 Claims, 6 Drawing Sheets

(51) Int. Cl.
*H04W 36/06* (2009.01)
*H04W 72/044* (2023.01)
*H04W 72/0453* (2023.01)
*H04W 72/541* (2023.01)

(52) U.S. Cl.
CPC ... *H04W 72/0453* (2013.01); *H04W 72/0473* (2013.01); *H04W 72/541* (2023.01)

(56) References Cited

U.S. PATENT DOCUMENTS

| | | |
|---|---|---|
| 2013/0165049 A1 | 6/2013 | Ahn et al. |
| 2013/0303214 A1 | 11/2013 | Ahmadi |
| 2013/0322260 A1* | 12/2013 | Yao ................ H04W 24/10 370/241 |
| 2014/0050134 A1 | 2/2014 | Ahn et al. |
| 2014/0341193 A1 | 11/2014 | Lee et al. |
| 2015/0119098 A1 | 4/2015 | Hsu et al. |
| 2015/0195795 A1 | 7/2015 | Loehr et al. |
| 2015/0245365 A1 | 8/2015 | Isokangas et al. |
| 2015/0334620 A1 | 11/2015 | Fu et al. |
| 2016/0234852 A1 | 8/2016 | Ko et al. |
| 2016/0323872 A1 | 11/2016 | Ahn et al. |
| 2018/0262233 A1* | 9/2018 | Laselva ................ H04W 88/06 |
| 2020/0021452 A1 | 1/2020 | Sharma et al. |
| 2020/0120678 A1* | 4/2020 | Zhou ................ H04W 72/1215 |
| 2021/0127405 A1 | 4/2021 | Ma et al. |

FOREIGN PATENT DOCUMENTS

| | | | |
|---|---|---|---|
| CN | 103516485 A | 1/2014 | |
| CN | 103843439 A | 6/2014 | |
| CN | 104429143 A | 3/2015 | |
| CN | 107293857 A | 10/2017 | |
| EP | 2210350 B1 | 1/2012 | |
| WO | 2011097532 A1 | 8/2011 | |
| WO | WO-2013019177 A1 * | 2/2013 | ............. H04B 1/005 |
| WO | 2014027790 A1 | 2/2014 | |
| WO | 2018166214 A1 | 9/2018 | |

* cited by examiner

COMMUNICATION METHOD AND APPARATUS

CROSS-REFERENCE TO RELATED APPLICATIONS

This is a continuation of U.S. patent application Ser. No. 17/427,477, filed on Jul. 30, 2021, which is a U.S. National Stage of International Patent Application No. PCT/CN2020/072808 filed on Jan. 17, 2020, which claims priority to Chinese Patent Application No. 201910104967.7, filed on Feb. 1, 2019. All of the aforementioned patent applications are hereby incorporated by reference in their entireties.

TECHNICAL FIELD

This application relates to the communications field, and more specifically, to a communication method and apparatus.

BACKGROUND

In recent years, rapid growth of various wireless applications leads to rapid development of a wireless communications system. On the one hand, performance of various wireless communications technologies (such as a cellular network, a wireless local area network, and Bluetooth) is greatly improved. On the other hand, a user accesses a network in various ways. Especially, after an intelligent terminal emerges, a terminal device may integrate communications modules of a plurality of wireless systems, to simultaneously access a plurality of wireless networks, for example, a long term evolution (long term evolution, LTE) system, a long term evolution advanced (LTE-A) system, wireless fidelity (wireless fidelity, Wi-Fi), a wireless local area network (wireless local area network, WLAN), Bluetooth (bluetooth, BT), and a global navigation satellite system (global navigation satellite system, GNSS). In a device coexistence mode, because a physical interval between transceivers of the communications modules is relatively small and operating frequencies of the transceivers are relatively close to each other, once the communications modules operate together, interference is inevitably caused to communication between communications systems, and normal data receiving and sending of the communications modules are affected.

Currently, a third generation partnership project ($3^{rd}$ generation partnership project, 3GPP) specifies some specifications of in-device coexistence (In-device coexistence, IDC), and specifies that a terminal device may report information such as a frequency, an interference type, and an interference direction to a network device. However, as an NR bandwidth increases and a bandwidth of a Wi-Fi frequency band is more abundant, messages specified in a protocol cannot cover all scenarios. This affects data transmission reliability of the terminal device.

Therefore, how to effectively adjust interference of in-device coexistence and improve data transmission reliability becomes an urgent problem to be resolved.

SUMMARY

In view of this, this application provides a communication method and apparatus, to reduce interference caused by coexistence in a terminal device and improve data transmission reliability.

According to a first aspect, a communication method is provided. The method provided in the first aspect may be performed by a terminal device, or may be performed by a chip configured in a terminal device. This is not limited in this application.

Specifically, the method includes: The terminal device determines first in-device coexistence IDC interference adjustment information, where the first IDC interference adjustment information includes frequency bandwidth information; and the terminal device sends the first IDC interference adjustment information to a network device.

In this application, the terminal device determines the first in-device coexistence IDC interference adjustment information, where the first IDC interference adjustment information includes the frequency bandwidth information, namely, frequency band information, and sends the first IDC interference adjustment information to the network device. The network device adjusts IDC interference based on the frequency band information included in the first IDC interference adjustment information, to reduce interference caused by coexistence in the terminal device and improve data transmission reliability.

With reference to the first aspect, in a first possible implementation of the first aspect, that the terminal device determines first in-device coexistence IDC interference adjustment information includes: When a first communications system of the terminal device is an interference source, the terminal device determines that a frequency and a bandwidth or a start frequency and an end frequency at which the terminal device is interfered with by the first communications system in a second communications system are the first IDC interference adjustment information; or when a first communications system of the terminal device is an interference source, the terminal device determines that a frequency and a bandwidth or a start frequency and an end frequency at which the terminal device is not interfered with by the first communications system in a second communications system are the first IDC interference adjustment information; or when a first communications system of the terminal device is an interference source, the terminal device determines that an operating frequency and an operating bandwidth or an operating start frequency and an operating end frequency of the terminal device in a second communications system are the first IDC interference adjustment information.

With reference to the first possible implementation of the first aspect, in a second possible implementation of the first aspect, the first IDC interference adjustment information is used to indicate the network device to switch a transmit frequency and a transmit bandwidth or a transmit start frequency and a transmit end frequency of the terminal device in the first communications system to the frequency and the bandwidth or the start frequency and the end frequency at which the second communications system is not interfered with; or the first IDC interference adjustment information is used to indicate the network device to switch a transmit frequency and a transmit bandwidth or a transmit start frequency and a transmit end frequency for the terminal device in the first communications system to the frequency and the bandwidth or the start frequency and the end frequency at which the second communications system is not interfered with; or the first IDC interference adjustment information is used to indicate the network device to switch an uplink bandwidth part BWP of the terminal device in the first communications system to a transmit frequency and a transmit bandwidth or a transmit start frequency and a transmit end frequency at which the second communications system is not interfered with; or the first IDC interference adjustment information is used to indicate the network device to reduce transmit power of the first communications system.

In the foregoing technical solution, the terminal device determines that the frequency and the bandwidth or the start frequency and the end frequency at which the terminal device is interfered with by the first communications system in the second communications system are the first IDC interference adjustment information, more precisely determines a frequency range of interference, and sends the first IDC interference adjustment information to the network device. The network device adjusts IDC interference based on the frequency and the bandwidth or the start frequency and the end frequency in the first IDC interference adjustment information. This prevents the terminal device from being interfered with by the first communications system in the second communications system, to improve data transmission reliability.

With reference to the first aspect, in a third possible implementation of the first aspect, that the terminal device determines first in-device coexistence IDC interference adjustment information includes: When a first communications system of the terminal device is an interfered source, the terminal device determines that a frequency and a bandwidth or a start frequency and an end frequency at which the terminal device is interfered with by a second communications system of the terminal device in the first communications system are the first IDC interference adjustment information; or when a first communications system of the terminal device is an interfered source, the terminal device determines that a frequency and a bandwidth or a start frequency and an end frequency at which the terminal device is not interfered with by a second communications system of the terminal device in the first communications system are the first IDC interference adjustment information; or when a first communications system of the terminal device is an interference source, the terminal device determines that an operating frequency and an operating bandwidth or an operating start frequency and an operating end frequency of the terminal device in a second communications system are the first IDC interference adjustment information.

With reference to the third possible implementation of the first aspect, in a fourth possible implementation of the first aspect, the first IDC interference adjustment information is used to indicate the network device to switch a receive frequency and a receive bandwidth or a receive start frequency and a receive end frequency of the terminal device in the first communications system to the frequency and the bandwidth or the start frequency and the end frequency that are not interfered with by the second communications system; or the first IDC interference adjustment information is used to indicate the network device to switch a transmit frequency and a transmit bandwidth or a transmit start frequency and a transmit end frequency of the first communications system for the terminal device to the frequency and the bandwidth or the start frequency and the end frequency that are not interfered with by the second communications system; or the first IDC interference adjustment information is used to indicate the network device to switch a downlink BWP of the terminal device in the first communications system to the frequency and the bandwidth or the start frequency and the end frequency that are not interfered with by the second communications system; or the first IDC interference adjustment information is used to indicate the network device to increase transmit power of the network device.

In the foregoing technical solution, the terminal device determines that the frequency and the bandwidth or the start frequency and the end frequency at which the terminal device is interfered with by the second communications system of the terminal device in the first communications system are the first IDC interference adjustment information, more precisely determines a frequency range of interference, and sends the first IDC interference adjustment information to the network device. The network device adjusts IDC interference based on the frequency and the bandwidth or the start frequency and the end frequency in the first IDC interference adjustment information. This prevents the terminal device from being interfered with by the second communications system in the first communications system, to improve data transmission reliability.

According to a second aspect, a communication method is provided. The method provided in the second aspect may be performed by a terminal device, or may be performed by a chip configured in a terminal device. This is not limited in this application.

Specifically, the method includes: The terminal device determines second in-device coexistence IDC interference adjustment information, where the second IDC interference adjustment information includes information indicating that the terminal device interferes with or does not interfere with, in a first communications system, an antenna of a second communications system of the terminal device; and the terminal device sends the second IDC interference adjustment information to a network device.

In this application, the terminal device determines that the information indicating that the terminal device interferes with or does not interfere with, in the first communications system, the antenna of the second communications system of the terminal device is the second IDC interference adjustment information, and sends the second IDC interference adjustment information to the network device, to reduce in-device coexistence interference and improve data transmission reliability.

With reference to the second aspect, in a first possible implementation of the second aspect, the second IDC interference adjustment information includes at least one piece of the following information: port information indicating that the terminal device interferes with, in the first communications system, a transmit antenna of the second communications system; or port information indicating that the terminal device does not interfere with, in the first communications system, a transmit antenna of the second communications system; or uplink reference signal resource SRS resource information indicating that the terminal device interferes with, in the first communications system, a transmit antenna of the second communications system; or uplink reference signal resource SRS resource information indicating that the terminal device does not interfere with, in the first communications system, a transmit antenna of the second communications system.

In the foregoing technical solution, the terminal device determines the port information indicating that the terminal device interferes with or does not interfere with, in the first communications system, the transmit antenna of the second communications system, or the terminal device determines the uplink reference signal resource SRS resource information indicating that the terminal device interferes with or does not interfere with, in the first communications system, the transmit antenna of the second communications system, to further determine an antenna that is of the terminal device and that is not interfered with, to improve data transmission reliability.

With reference to the first possible implementation of the second aspect, in a second possible implementation of the second aspect, the second IDC interference adjustment information is used to indicate the network device to determine that an uplink transmit antenna of the terminal device in the first communications system is an antenna that does not interfere with the second communications system; or the second IDC interference adjustment information is used to indicate the network device to schedule a physical uplink shared channel PUSCH to be transmitted on an antenna that does not interfere with the second communications system.

With reference to the second possible implementation of the second aspect, in a third possible implementation of the second aspect, the method further includes: The terminal device receives information that is about the transmit antenna of the terminal device in the first communications system and that is indicated by the network device by using an uplink reference signal resource indicator SRI in downlink control signal DCI.

During initial access of a mobile phone, the network device may configure a plurality of SRS resources, so that the terminal device sends the SRSs in turn. Each SRS resource corresponds to a different antenna port (port), and each antenna port may be mapped to a corresponding physical antenna. Then, the network device indicates, by using the SRI in the DCI, an SRS resource used by the terminal device to send the physical uplink shared channel PUSCH. In other words, the network device indicates, by using the DCI, an antenna used by the terminal device as the transmit antenna in the first communications system.

According to a third aspect, a communication method is provided. The method provided in the third aspect may be performed by a network device, or may be performed by a chip configured in a network device. This is not limited in this application.

Specifically, the method includes: The network device receives first in-device coexistence IDC interference adjustment information sent by a terminal device, where the first IDC interference adjustment information includes frequency bandwidth information; and the network device adjusts IDC interference based on the first IDC interference adjustment information.

In the foregoing technical solution, the network device receives the first IDC interference adjustment information sent by the terminal device, and adjusts the IDC interference based on the first IDC interference adjustment information, to reduce the in-device coexistence interference and improve data transmission reliability.

With reference to the third aspect, in a first possible implementation of the third aspect, when a first communications system of the terminal device is an interference source, the first IDC interference adjustment information is a frequency and a bandwidth or a start frequency and an end frequency at which a second communications system of the terminal device is interfered with by the terminal device in the first communications device; or when a first communications system of the terminal device is an interference source, the first IDC interference adjustment information is a frequency and a bandwidth or a start frequency and an end frequency at which a second communications system of the terminal device is not interfered with by the terminal device in the first communications device; or when a first communications system of the terminal device is an interference source, the first IDC interference adjustment information is an operating frequency and an operating bandwidth or an operating start frequency and an operating end frequency of the terminal device in a second communications system.

With reference to the third aspect, in a second possible implementation of the third aspect, when a first communications system of the terminal device is an interfered source, the first IDC interference adjustment information is a frequency and a bandwidth or a start frequency and an end frequency at which a second communications system of the terminal device interferes with the terminal device in the first communications system; or when a first communications system of the terminal device is an interfered source, the first IDC interference adjustment information is a frequency and a bandwidth or a start frequency and an end frequency at which a second communications system of the terminal device does not interfere with the terminal device in the first communications system; or when a first communications system of the terminal device is an interfered source, the first IDC interference adjustment information is an operating frequency and an operating bandwidth or an operating start frequency and an operating end frequency of the terminal device in a second communications system.

With reference to the first possible implementation of the third aspect, in a third possible implementation of the third aspect, that the network device adjusts IDC interference based on the first IDC interference adjustment information includes: The network device switches, based on the first IDC interference adjustment information, a transmit frequency and a transmit bandwidth or a transmit start frequency and a transmit end frequency of the terminal device in the first communications system to the frequency and the bandwidth or the start frequency and the end frequency at which the second communications system is not interfered with; or the network device switches, based on the first IDC interference adjustment information, a transmit frequency and a transmit bandwidth or a transmit start frequency and a transmit end frequency for the terminal device in the first communications system to the frequency and the bandwidth or the start frequency and the end frequency at which the second communications system is not interfered with; or the network device switches, based on the first IDC interference adjustment information, an uplink bandwidth part BWP of the terminal device in the first communications system to a transmit frequency and a transmit bandwidth or a transmit start frequency and a transmit end frequency at which the second communications system is not interfered with; or the network device reduces transmit power of the first communications system based on the first IDC interference adjustment information.

With reference to the third possible implementation of the third aspect, in a fourth possible implementation of the third aspect, that the network device reduces transmit power of the terminal device in the first communications system based on the first IDC interference adjustment information includes: The network device determines a magnitude of interference based on the first IDC interference adjustment information; and the network device reduces the transmit power of the first communications system of the terminal device based on the magnitude of interference.

Optionally, the network device determines, based on the frequency band information included in the first IDC interference adjustment information, an overlapping size or an interval size between a frequency band at which the second communications system of the terminal device is interfered with by the terminal device in the first communications system and an operating frequency band of the terminal device in the second communications system, to determine a reduction amplitude of the transmit power of the first communications system of the terminal device. Larger overlapping or a closer interval indicates a larger reduction amplitude, and smaller overlapping or a longer interval indicates a smaller reduction amplitude.

In the foregoing technical solution, the first IDC interference adjustment information is the frequency and the bandwidth or the start frequency and the end frequency at which the second communications system of the terminal device is interfered with by the terminal device in the first communications system, and more precisely indicates a frequency range of interference. The network device adjusts IDC interference based on the frequency and the bandwidth or the start frequency and the end frequency in the first IDC interference adjustment information, to prevent the terminal device from being interfered with by the first communications system in the second communications system, to improve data transmission reliability.

With reference to the second possible implementation of the third aspect, in a fifth possible implementation of the third aspect, that the network device adjusts IDC interference based on the first IDC interference adjustment information includes: The network device switches, based on the first IDC interference adjustment information, a receive frequency and a receive bandwidth or a receive start frequency and a receive end frequency of the terminal device in the first communications system to the frequency and the bandwidth or the start frequency and the end frequency that are not interfered with by the second communications system; or the network device switches, based on the first IDC interference adjustment information, a transmit frequency and a transmit bandwidth or a transmit start frequency and a transmit end frequency of the first communications system for the terminal device to the frequency and the bandwidth or the start frequency and the end frequency that are not interfered with by the second communications system; or the network device switches, based on the first IDC interference adjustment information, a downlink BWP of the terminal device in the first communications system to a receive frequency and a receive bandwidth or a receive start frequency and a receive end frequency that are not interfered with by the second communications system; or the network device increases transmit power of the network device based on the first IDC interference adjustment information.

With reference to the fifth possible implementation of the third aspect, in a sixth possible implementation of the third aspect, that the network device increases transmit power of the network device based on the first IDC interference adjustment information includes: The network device determines a magnitude of interference based on the first IDC interference adjustment information; and the network device increases the transmit power of the network device based on the magnitude of interference.

Optionally, the network device determines, based on the frequency band information included in the first IDC interference adjustment information, an overlapping size or an interval size between a frequency band at which the terminal device is interfered with by the second communications system of the terminal device in the first communications system and an operating frequency band of the terminal device in the first communications system, to determine an increase amplitude of the transmit power of the network device. Larger overlapping or a closer interval indicates a larger increase amplitude, and smaller overlapping or a longer interval indicates a smaller increase amplitude.

In the foregoing technical solution, the first IDC interference adjustment information is the frequency and the bandwidth or the start frequency and the end frequency at which the second communications system of the terminal device interferes with the terminal device in the first communications system, and more precisely indicates a frequency range of interference. The network device adjusts IDC interference based on the frequency and the bandwidth or the start frequency and the end frequency in the first IDC interference adjustment information, to prevent the second communications system of the terminal device from interfering with the first communications system, to improve data transmission reliability.

According to a fourth aspect, a communication method is provided. The method provided in the fourth aspect may be performed by a network device, or may be performed by a chip configured in a network device. This is not limited in this application.

Specifically, the method includes: The network device receives second in-device coexistence IDC interference adjustment information sent by a terminal device, where the second IDC interference adjustment information includes information indicating that the terminal device interferes with or does not interfere with, in the first communications system, an antenna of a second communications system of the terminal device; and the network device determines a transmit antenna of the terminal device based on the second IDC interference adjustment information.

In the technical solutions of this application, the network device receives the second IDC interference adjustment information that is determined by the terminal device and that includes the information indicating that the terminal device interferes with or does not interfere with, in the first communications system, the antenna of the second communications system of the terminal device, and adjusts interference based on the second IDC interference adjustment information, to reduce in-device coexistence interference and improve data transmission reliability.

With reference to the fourth aspect, in a first possible implementation of the fourth aspect, the second IDC interference adjustment information includes at least one piece of the following information: port information indicating that the terminal device interferes with, in the first communications system, a transmit antenna of the second communications system; or port information indicating that the terminal device does not interfere with, in the first communications system, a transmit antenna of the second communications system; or uplink reference signal resource SRS resource information indicating that the terminal device interferes with, in the first communications system, a transmit antenna of the second communications system; or uplink reference signal resource SRS resource information indicating that the terminal device does not interfere with, in the first communications system, a transmit antenna of the second communications system.

With reference to the fourth aspect or the first possible implementation of the fourth aspect, in a second possible implementation of the fourth aspect, that the network device determines a transmit antenna of the terminal device based on the second IDC interference adjustment information includes: the network device determines, based on the second IDC interference adjustment information, that an uplink transmit antenna of the terminal device in the first communications system is an antenna that does not interfere with the second communications system; or the network device schedules, based on the second IDC interference adjustment information, a physical uplink shared channel PUSCH to be transmitted on an antenna that is in the first communications system and that does not interfere with the second communications system.

In the foregoing technical solution, the terminal device determines that the port information indicating that the terminal device interferes with or does not interfere with, in the first communications system, the transmit antenna of the second communications system is the second IDC interference adjustment information; or the terminal device determines that uplink reference signal resource SRS resource information indicating that the terminal device interferes with or does not interfere with, in the first communications system, the transmit antenna of the second communications system is the second IDC interference adjustment information; and the terminal device sends the second IDC interference adjustment information to the network device. The network device determines, based on the second IDC interference adjustment information, that an antenna that is of the terminal device and that is not interfered with is the transmit antenna, to improve data transmission reliability.

With reference to the second possible implementation of the fourth aspect, in a third possible implementation of the fourth aspect, the method further includes: The network device sends information about the transmit antenna of the terminal device in the first communications system to the terminal device by using a downlink control signal DCI.

Optionally, the network device indicates the information about the transmit antenna of the terminal device in the first communications system by using the uplink reference signal resource indicator SRI in the DCI.

During initial access of a mobile phone, the network device may configure a plurality of SRS resources, so that the terminal device sends the SRSs in turn. Each SRS resource corresponds to a different antenna port (port), and each antenna port may be mapped to a corresponding physical antenna. Then, the network device indicates, by using the SRI in the DCI, an SRS resource used by the terminal device to send the physical uplink shared channel PUSCH. In other words, the network device indicates, by using the DCI, an antenna used by the terminal device as the transmit antenna in the first communications system.

According to a fifth aspect, a communication apparatus is provided. The apparatus includes units configured to perform the steps in the method of the first aspect or any possible implementation of the first aspect, or includes units configured to perform the steps in the method of the second aspect or any possible implementation of the second aspect. A function may be implemented by hardware, or may be implemented by hardware by executing corresponding software. The hardware or the software includes one or more units corresponding to the foregoing function.

According to a sixth aspect, a communication apparatus is provided. The apparatus includes units configured to perform the steps in the method of the third aspect or any possible implementation of the third aspect, or includes units configured to perform the steps in the method of the fourth aspect or any possible implementation of the fourth aspect. A function may be implemented by hardware, or may be implemented by hardware by executing corresponding software. The hardware or the software includes one or more units corresponding to the foregoing function.

According to a seventh aspect, a communications device is provided, and a structure of the communications device includes a processor. The processor is configured to support the communications device in performing functions in the first aspect to the fourth aspect and the possible implementations of the first aspect to the fourth aspect. In a possible design, the communications device may further include a transceiver, configured to support the communications device in receiving or sending information.

In a possible design, the communications device may further include a memory. The memory is configured to couple to the processor, and store necessary program instructions and necessary data in the communications device.

Alternatively, the communications device includes a memory and a processor. The memory is configured to store a computer program, and the processor is configured to invoke the computer program from the memory and run the computer program, so that the communications device performs the method in any possible implementation of the first aspect to the fourth aspect.

According to an eighth aspect, a computer program product is provided. The computer program product includes a computer program. When being executed by a processor, the computer program is used to perform the method in any possible implementation of the first aspect and the second aspect.

According to a ninth aspect, a computer program product is provided. The computer program product includes a computer program, and when the computer program is executed by a processor, the computer program is used to perform the method in any possible implementation of the third aspect and the fourth aspect.

According to a tenth aspect, a computer-readable storage medium is provided. The computer-readable storage medium stores a computer program, and when the computer program is executed, the computer program is used to perform the method in any possible implementation of the first aspect and the second aspect.

According to an eleventh aspect, a computer-readable storage medium is provided. The computer-readable storage medium stores a computer program, and when the computer program is executed, the computer program is used to perform the method in any possible implementation of the third aspect and the fourth aspect.

According to a twelfth aspect, a chip is provided, including a processor. The processor is configured to read and execute a computer program stored in a memory, to perform the method in any possible implementation of the first aspect and the second aspect.

Optionally, the chip further includes the memory, and the memory and the processor are connected to the memory through a circuit or a wire.

Further, optionally, the chip further includes a communications interface.

According to a thirteenth aspect, a chip is provided, including a processor. The processor is configured to read and execute the computer program stored in the memory, to perform the method in any possible implementation of the third aspect and the fourth aspect.

Optionally, the chip further includes the memory, and the memory and the processor are connected to the memory through a circuit or a wire.

Further, optionally, the chip further includes a communications interface.

According to a fourteenth aspect, a processing apparatus is provided, including a processor and a memory. The processor is configured to read instructions stored in the memory, receive a signal by using a receiver, and transmit a signal by using a transmitter, to perform the method in any possible implementation of the first aspect to the fourth aspect.

Optionally, there are one or more processors, and there are one or more memories.

Optionally, the processor may be implemented by hardware or software. When the processor is implemented by the hardware, the processor may be a logic circuit, an integrated circuit, or the like. When the processor is implemented by the software, the processor may be a general-purpose processor, and is implemented by reading software code stored in the memory.

Optionally, the memory may be integrated with the processor, or the memory and the processor are disposed separately.

In a specific implementation process, the memory may be a non-transitory (non-transitory) memory such as a read-only memory ROM. The memory and the processor may be integrated on a same chip, or may be separately disposed on different chips. A type of the memory and a manner of disposing the memory and the processor are not limited in this embodiment of this application.

It should be understood that, for a related data exchange process, for example, an indication information sending process may be a process of outputting indication information from the processor, and a capability information receiving process may be a process of receiving input capability information by the processor. Specifically, data output by the processor may be output to the transmitter, and input data received by the processor may be from the receiver. The transmitter and the receiver may be collectively referred to as a transceiver.

According to a fifteenth aspect, a communications system is provided, and includes the foregoing network device and the terminal device.

According to a sixteenth aspect, a computer program is provided. When the computer program is run on a computer, the computer is enabled to perform the method in any possible implementation of the first aspect to the fourth aspect.

According to the communication method and apparatus provided in this application, the terminal device determines IDC interference adjustment information, and sends the IDC interference adjustment information to the network device, and the network device adjusts IDC interference based on the IDC interference adjustment information. This avoids mutual interference caused when the terminal device simultaneously accesses a plurality of communications systems, to reduce interference caused by coexistence in the terminal device and improve data transmission reliability.

DESCRIPTION OF EMBODIMENTS

The following describes technical solutions of this application with reference to the accompanying drawings.

Figure 1:
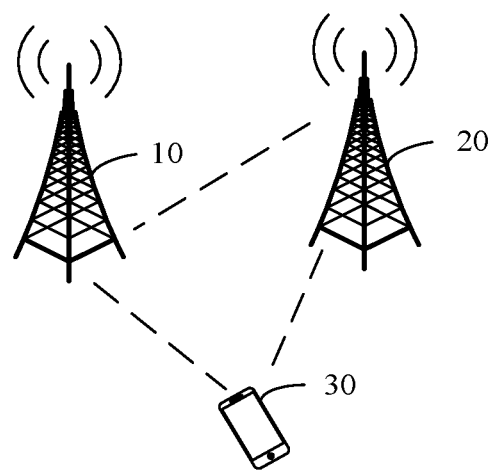
FIG. 1 shows a wireless communications system applicable to an embodiment of this application.

FIG. 1 shows a wireless communications system 100 applicable to an embodiment of this application. The wireless communications system may include one terminal device and one or more network devices. The terminal device (for example, 30 shown in FIG. 1) may perform wireless communication with the one or more network devices (for example, 10 and 20 shown in FIG. 1). The wireless communications system 100 may include but is not limited to: a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a cellular communications system, a universal mobile telecommunications system (universal mobile telecommunication system, UMTS), a worldwide interoperability for microwave access (worldwide interoperability for microwave access, WiMAX) communications system, a wireless fidelity (wireless fidelity, Wi-Fi) communications system, a future fifth generation (5th generation, 5G) system, and the like.

The terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in 5G network, or a terminal device in a future evolved public land mobile network (public land mobile network, PLMN). This is not limited in the embodiments of this application.

The network device in the embodiments of this application may be a device configured to communicate with the terminal device. The network device may be a base transceiver station (base transceiver station, BTS) in a global system for mobile communications (global system for mobile communications, GSM) system or a code division multiple access (code division multiple access, CDMA) system, or may be a NodeB (NodeB, NB) in a wideband code division multiple access (wideband code division multiple access, WCDMA) system, or may be an evolved NodeB (evolved NodeB, cNB or eNodeB) in an LTE system, or may be a radio controller in a cloud radio access network (cloud radio access network, CRAN) scenario. Alternatively, the network device may be a relay node, an access point, a vehicle-mounted device, a wearable device, a network device in 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), or a memory (also referred to as a main memory). The operating system may be any one or more computer operating systems that implement service processing through a process (process), for example, a Linux operating system, a Unix operating system, an Android operating system, an iOS operating system, and a Windows operating system. The application layer includes applications, such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute a program.

In addition, aspects or features of this application may be implemented as a method, an apparatus, or a product that uses standard programming or engineering technologies, or may be implemented as a method, an apparatus, or a product that uses standard programming and engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (compact disc, CD), or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may represent one or more devices or other machine-readable media configured to store information, or one or more devices and other machine-readable media. The term "machine-readable media" may include but is not limited to a radio channel and various other media that can store, include, and carry instructions or data, or instructions and data.

When there are a plurality of communications systems in one terminal device, and communication frequency bands of different communications systems are adjacent, a sending operation of one communications system interferes with a receiving operation of another system, resulting in in-device coexistence interference. As a bandwidth of the wireless communications system increases and continuously abounds, an IDC message in the prior art cannot resolve a problem of in-device coexistence interference in all scenarios. This affects data transmission reliability of the terminal device.

Figure 2:
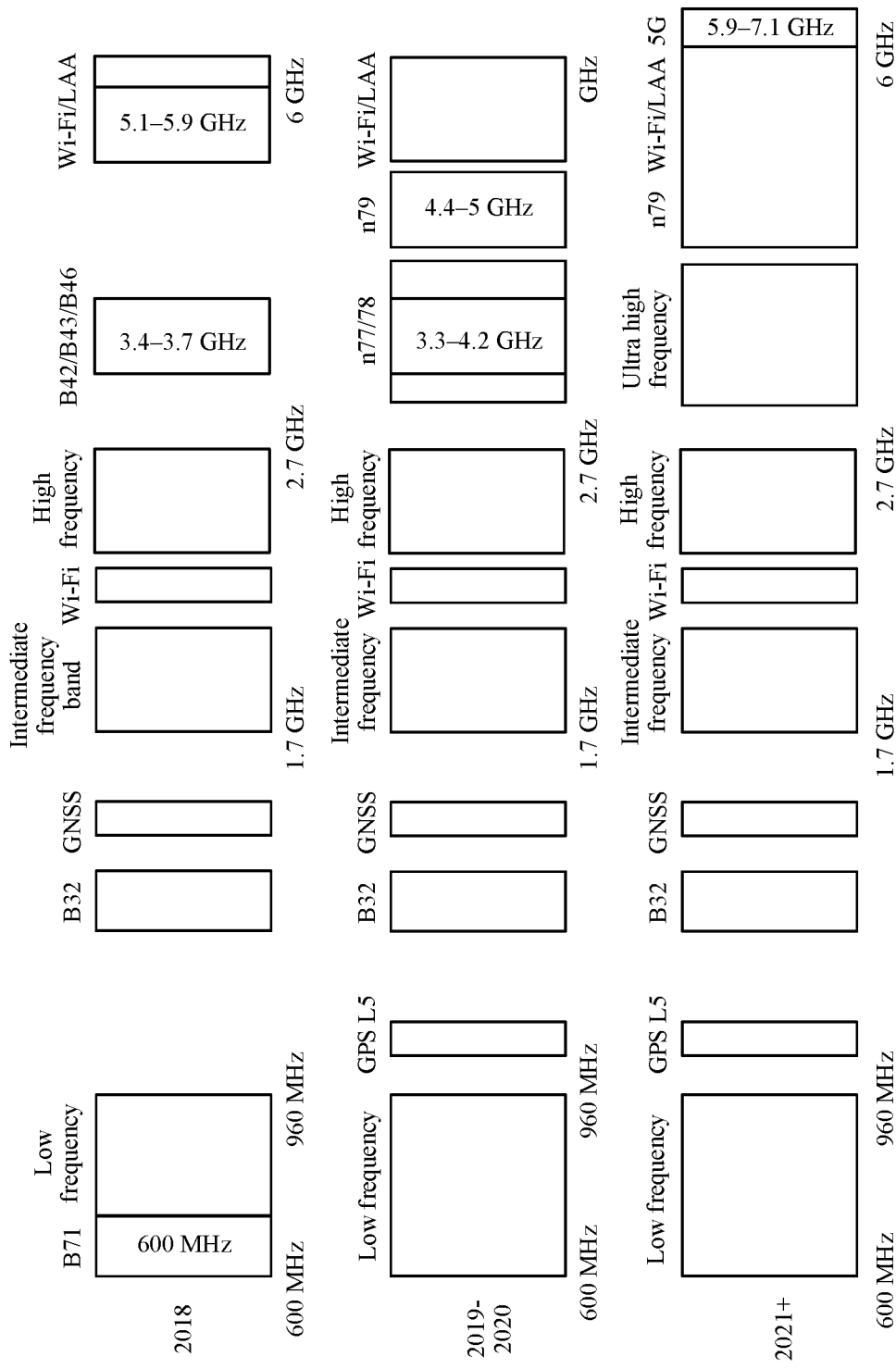
FIG. 2 is a frequency band distribution diagram of an existing communications system.

FIG. 2 is a frequency band distribution diagram of an existing communications system. As shown in FIG. 2, from 2018 to 2021, more communications systems can be accessed by the terminal device. For example, compared with a communications system in 2018, a communications system in 2019 adds an L5 frequency band of a global positioning system (global positioning system, GPS). In addition, because existing available frequency bands are limited, as a communications system increases, mutual interference such as adjacent-channel interference, harmonic interference, co-channel interference, and cross-modulation interference exists in a plurality of communications systems for a long time.

For example, the adjacent-channel interference exists among Wi-Fi 2.4 GHZ, BT and B40/n40, B7/n7 and B41/n41, 5 GHZ and n77, n79, and the like. That is, operating frequencies of the terminal device in the plurality of communications systems are neighboring or adjacent, because a frequency modulation signal includes infinite number of side-frequency components, when some side-frequency components fall with an operating band of an adjacent-channel receiver, the adjacent-channel interference occurs. Wi-Fi 2.4 GHZ, 5 GHZ, and BT are interfered with by harmonics such as B1/n1, B5/n5, and B41/n41. That is, when a second harmonic and a third harmonic of a signal generated by the terminal device in a communications system fall within the operating frequency band of the adjacent-channel receiver, the harmonic interference occurs. Wi-Fi 5 GHz and licensed assisted access (license assisted access, LAA)/LTE in unlicensed spectrum (LTE in unlicensed spectrum, LTE-U)/enhanced licensed assisted access (enhanced licensed assisted access, eLAA) coexist on a same frequency band. Cross-modulation interference exists among Wi-Fi dual-band, BT concurrency, and unit multi-band concurrency. That is, when signals, of different frequencies, generated by the terminal device in a plurality of communications systems with different operating frequencies act on a non-linear circuit, the signals of different frequencies modulate each other to generate a signal of a new frequency for output. If the frequency exactly falls within a frequency band of an operating channel of the receiver, interference is caused to the receiver.

Therefore, this application provides a communication method, to effectively avoid in-device coexistence interference and improve data transmission reliability.

For ease of description, an example in which a cellular communications system and a Wi-Fi communications system interfere with each other is used for description in the embodiments of this application. A first communications system is the cellular communications system, and a second communications system is the Wi-Fi communications system. However, this is not limited in the embodiments of this application.

Figure 3:
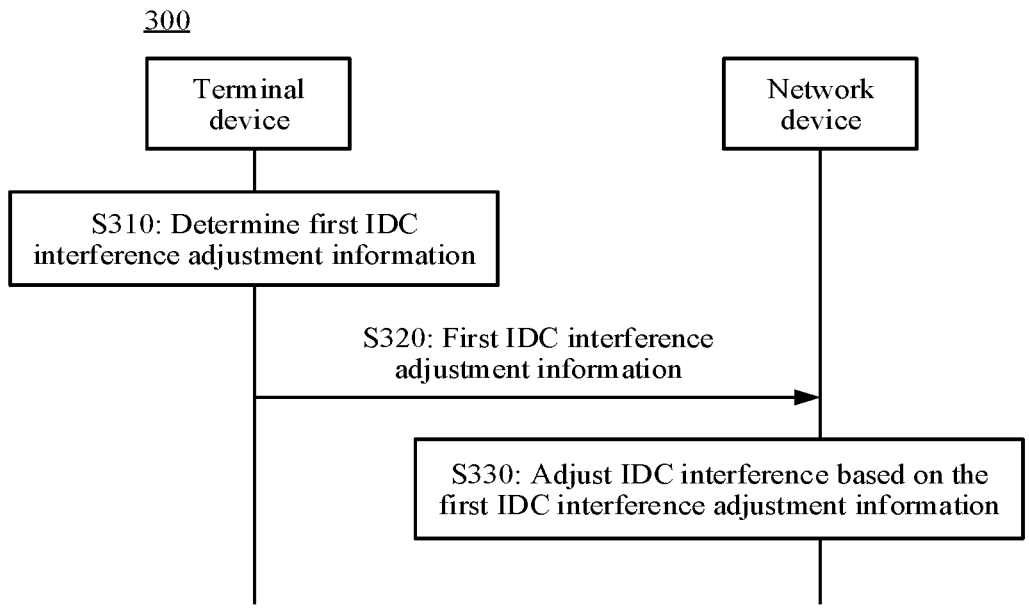
FIG. 3 is a schematic flowchart of a communication method according to an embodiment of this application.

FIG. 3 shows a communication method 300 according to an embodiment of this application. The following describes steps in the method 300 in detail with reference to FIG. 3.

It should be understood that in this embodiment of this application, the method 300 is described by using an example in which the method 300 is performed by a terminal device and a network device. By way of example, and not limitation, the method 300 may alternatively be performed by a chip used in a terminal device and a chip used in a network device.

S310: The terminal device determines first in-device coexistence IDC interference adjustment information.

Currently, most terminal devices support a plurality of wireless communications technologies. Therefore, there may be a plurality of wireless communications systems in one terminal device. For example, a cellular communications system, a Wi-Fi communications system, and the like may coexist in one terminal device. Because spectrums used by these communications systems may be adjacent, when a wireless communications system of the terminal device sends data, relatively strong interference may be caused to another wireless communications system. Therefore, before the terminal device transmits data, the terminal device needs to first determine the first in-device coexistence IDC interference adjustment information.

When the cellular communications system of the terminal device is an interference source, in other words, when data sent by the terminal device in the cellular communications system is the interference source, data receiving of the terminal device in the Wi-Fi communications system is affected. The first IDC interference adjustment information includes a frequency range in which the terminal device is interfered with by the cellular communications system in the Wi-Fi communications system, namely, a start frequency and an end frequency at which the terminal device is interfered with by the cellular communications system in the Wi-Fi communications system. Alternatively, the first IDC interference adjustment information includes a frequency and a bandwidth at which the terminal device is interfered with by the cellular communications system in the Wi-Fi communications system.

Optionally, the first IDC interference adjustment information may further be a start frequency and an end frequency or a frequency and a bandwidth at which the terminal device is not interfered with by the cellular communications system in the Wi-Fi communications system.

For example, when an operating frequency of the terminal device in the Wi-Fi communications system is 100 MHZ, an operating bandwidth of the terminal device in the Wi-Fi communications system is 200 MHz, and a signal sent by the cellular communications system is the interference source, the terminal device determines the first IDC interference adjustment information through internal hardware measurement. For example, the terminal device traverses each frequency and bandwidth of the Wi-Fi communications system in the Wi-Fi communications system to send a measurement signal. If sensitivity of receiving the measurement signal by the terminal device in the Wi-Fi communications system decreases, it indicates that the terminal device is interfered with by the cellular communications system in the Wi-Fi communications system. In this case, a frequency and a bandwidth used by the terminal device to send the measurement signal in the Wi-Fi communications system are a frequency and a bandwidth that are interfered with by the cellular communications system. If sensitivity of receiving the measurement signal by the terminal device in the Wi-Fi communications system does not decrease, it indicates that the terminal device is not interfered with by the cellular communications system in the Wi-Fi communications system. In this case, a frequency and a bandwidth used by the terminal device to send the measurement signal in the Wi-Fi communications system are a frequency and a bandwidth that are not interfered with by the cellular communications system. Through measurement, the frequency at which the terminal device is interfered with by the simultaneously operating cellular communications system in the Wi-Fi communications system is 50 MHZ, the start frequency at which the terminal device is interfered with by the cellular communications system in the Wi-Fi communications system is 30 MHz, and the end frequency at which the terminal device is interfered with by the cellular communications system in the Wi-Fi communications system is 70 MHz. Therefore, the bandwidth at which the terminal device is interfered with by the cellular communications system in the Wi-Fi communications system is 40 MHz. In this case, the first IDC interference adjustment information determined by the terminal device is the start frequency 30 MHz and the end frequency 70 MHz at which the terminal device is interfered with by the cellular communications system in the Wi-Fi communications system, or the first IDC interference adjustment information is the frequency 50 MHz and the bandwidth 40 MHz at which the terminal device is interfered with by the cellular communications system in the Wi-Fi communications system. Alternatively, the first IDC interference adjustment information is a start frequency 0 MHZ and an end frequency 30 MHz at which the terminal device is not interfered with by the cellular communications system in the Wi-Fi communications system, or a start frequency 70 MHz and an end frequency 200 MHz at which the terminal device is not interfered with by the cellular communications system in the Wi-Fi communications system. Alternatively, the first IDC interference adjustment information is a frequency 10 MHz and a bandwidth 20 MHz at which the terminal device is not interfered with by the cellular communications system in the Wi-Fi communications system, and a frequency 135 MHz and a bandwidth 130 MHz at which the terminal device is not interfered with by the cellular communications system in the Wi-Fi communications system.

Optionally, the interference source may alternatively be data sent by the network device in the cellular communications system. This is not limited in this embodiment of this application.

Optionally, when data sent by the terminal device in the cellular communications system is the interference source, the terminal device determines that the first IDC interference adjustment information is an operating frequency and an operating bandwidth of the terminal device in the Wi-Fi communications system, or the first IDC interference adjustment information is an operating start frequency and an operating end frequency of the terminal device in the Wi-Fi communications system.

For example, the cellular communications system in the terminal device is the interference source. In a communication process, if the operating frequency of the terminal device in the Wi-Fi communications system is 150 MHz, the operating start frequency of the terminal device in the Wi-Fi communications system is 100 MHZ, and the operating end frequency of the terminal device in the Wi-Fi communications system is 200 MHZ, the first IDC interference adjustment information is the operating frequency 150 MHz and the operating bandwidth 100 MHZ of the terminal device in the Wi-Fi communications system, or the first IDC interference adjustment information is the operating start frequency 100 MHz and the operating end frequency 200 MHz of the terminal device in the Wi-Fi communications system.

Correspondingly, when the Wi-Fi communications system is the interference source, in other words, when data sent by the terminal device in the Wi-Fi communications system is the interference source, the cellular communications system is an interfered source, and data receiving of the terminal device in the cellular communications system is affected. The first IDC interference adjustment information includes a start frequency and an end frequency at which the terminal device is interfered with by the Wi-Fi communications system in the cellular communications system, or the first IDC interference adjustment information includes a frequency and a bandwidth at which the terminal device is interfered with by the Wi-Fi communications system in the cellular communications system.

Optionally, the interference source may alternatively be data sent by the network device in the Wi-Fi communications system. This is not limited in this embodiment of this application.

Optionally, the first IDC interference adjustment information may alternatively be a start frequency and an end frequency or a frequency and a bandwidth at which the terminal device is not interfered with by the Wi-Fi communications system in the cellular communications system.

For example, when an operating frequency of the terminal device in the Wi-Fi communications system is 100 MHZ, an operating bandwidth of the terminal device in the Wi-Fi communications system is 200 MHz, and a signal sent by the Wi-Fi communications system is the interference source, the terminal device determines the first IDC interference adjustment information through internal hardware measurement. For example, the terminal device traverses each frequency and bandwidth of the Wi-Fi communications system in the Wi-Fi communications system to send a measurement signal. If sensitivity of receiving the measurement signal by the terminal device in the Wi-Fi communications system decreases, it indicates that the terminal device is interfered with by the cellular communications system in the Wi-Fi communications system. In this case, a frequency and a bandwidth used by the terminal device to send the measurement signal in the Wi-Fi communications system are a frequency and a bandwidth that are interfered with by the cellular communications system. If sensitivity of receiving the measurement signal by the terminal device in the Wi-Fi communications system does not decrease, it indicates that the terminal device is not interfered with by the cellular communications system in the Wi-Fi communications system. In this case, a frequency and a bandwidth used by the terminal device to send the measurement signal in the Wi-Fi communications system are a frequency and a bandwidth that are not interfered with by the cellular communications system. Through measurement, the frequency at which the terminal device is interfered with by the Wi-Fi communications system in the simultaneously operating cellular communications system is 50 MHZ, the start frequency at which the terminal device is interfered with by the Wi-Fi communications system in the cellular communications system is 30 MHz, and the end frequency at which the terminal device is interfered with by the Wi-Fi communications system in the cellular communications system is 70 MHz. Therefore, the bandwidth at which the terminal device is interfered with by the Wi-Fi communications system in the cellular communications system is 40 MHz. In this case, the first IDC interference adjustment information determined by the terminal device is the start frequency 30 MHz and the end frequency 70 MHz at which the terminal device is interfered with by the Wi-Fi communications system in the cellular communications system, or the first IDC interference adjustment information is the frequency 50 MHz and the bandwidth 40 MHz at which the terminal device is interfered with by the Wi-Fi communications system in the cellular communications system. Alternatively, the first IDC interference adjustment information is a start frequency 0 MHZ and an end frequency 30 MHz at which the terminal device is not interfered with by the Wi-Fi communications system in the cellular communications system, or a start frequency 70 MHz and an end frequency 200 MHz at which the terminal device is not interfered with by the Wi-Fi communications system in the cellular communications system. Alternatively, the first IDC interference adjustment information is a frequency 10 MHz and a bandwidth 20 MHz at which the terminal device is not interfered with by the Wi-Fi communications system in the cellular communications system, or a frequency 135 MHz and a bandwidth 130 MHz at which the terminal device is not interfered with by the Wi-Fi communications system in the cellular communications system.

Optionally, when the cellular communications system is the interfered source, the terminal device determines that the first IDC interference adjustment information is an operating frequency and an operating bandwidth of the terminal device in the Wi-Fi communications system, or the first IDC interference adjustment information is an operating start frequency and an operating end frequency of the terminal device in the Wi-Fi communications system.

For example, the cellular communications system in the terminal device is the interfered source. In a communication process, the cellular communications system is interfered with by the Wi-Fi communications system in the same terminal device, and data receiving of the terminal device in the cellular communications system is affected. If the operating frequency of the terminal device in the Wi-Fi communications system is 150 MHZ, the operating start frequency of the terminal device in the Wi-Fi communications system is 100 MHZ, and the operating end frequency of the terminal device in the Wi-Fi communications system is 200 MHZ, the first IDC interference adjustment information is the operating frequency 150 MHz and the operating bandwidth 100 MHz of the terminal device in the Wi-Fi communications system, or the first IDC interference adjustment information is the operating start frequency 100 MHz and the operating end frequency 200 MHz of the terminal device in the Wi-Fi communications system.

In the foregoing technical solution, the first IDC interference adjustment information determined by the terminal device includes frequency bandwidth information, namely, frequency band information. The frequency band information may be used to accurately determine an IDC interference range, to effectively adjust IDC interference.

Optionally, the first IDC interference adjustment information may further include an interference direction. To be specific, a first communications system interferes with a second communications system, or a second communications system interferes with a first communications system.

Optionally, the first IDC interference adjustment information may further include an interference type. For example, the interference type includes LTE interference, cellular interference, Wi-Fi interference, and the like. This is not limited in this embodiment of this application.

It should be noted that there may be one or more communications systems in the terminal device, and the one or more first communications systems may be same communications systems, or may be different communications systems. This is not limited in this embodiment of this application.

When a plurality of communications systems coexist in the terminal device, because a frequency band range used by the plurality of communications systems is limited, interference exists between the plurality of communications systems coexisted in the device. To avoid a decrease in a system throughput caused by the interference, the terminal device determines the first IDC interference adjustment information through measurement. The first IDC interference adjustment information is used to indicate the network device to adjust the IDC interference, to avoid interference between the plurality of communications systems in the terminal device, and improve data transmission reliability.

S320: The terminal device sends the first IDC interference adjustment information to the network device.

After determining the first IDC interference adjustment information, the terminal device sends the first IDC interference adjustment information to the network device, to indicate the network device to adjust the IDC interference.

S330: The network device adjusts the IDC interference based on the first IDC interference adjustment information.

After receiving the first IDC interference adjustment information, the network device adjusts the IDC interference based on the first IDC interference adjustment information. There are a plurality of manners for adjusting the IDC interference, for example, frequency division multiplexing (frequency division multiplexing, FDM), time division multiplexing (time division multiplexing, TDM), and autonomous rejection. The FDM means that interfering wireless communications systems are adjusted to a frequency band that does not interfere with each other to operate. For example, if the cellular communications system and the Wi-Fi communications system interfere with each other, the cellular communications system and the Wi-Fi communications system may be adjusted to a frequency band that does not interfere with each other to operate. The TDM means that the interfering wireless communication systems operate on an interfering frequency band in a time division mode. Only one wireless communication system transmits and receives data within a period of time. The autonomous rejection means that when uplink sending of the cellular communications system or the Wi-Fi communications system or uplink sending of the cellular communications system and the Wi-Fi communications system interferes with another wireless communications system, the terminal device automatically cancels uplink data sending of the cellular communications system or the Wi-Fi communications system or uplink data sending of the cellular communications system and the Wi-Fi communications system.

Optionally, after receiving the first IDC interference adjustment information sent by the terminal device, the network device adjusts the IDC interference based on the frequency bandwidth information included in the first IDC interference adjustment information, to reduce the IDC interference and improve data transmission reliability.

Optionally, when the first communications system is the interference source, the network device switches, based on the first IDC interference adjustment information, a transmit frequency and a transmit bandwidth or a start frequency and an end frequency of the terminal device in the first communications system to a frequency and a bandwidth or a start frequency and an end frequency that do not interfere with the second communications system. Alternatively, the network device switches, based on the first IDC interference adjustment information, a transmit frequency and a transmit bandwidth or a start frequency and an end frequency of the terminal device in the first communications system to a frequency and a bandwidth or a start frequency and an end frequency that do not interfere with the second communications system. Alternatively, the network device switches, based on the first IDC interference adjustment information, an uplink bandwidth part (bandwidth part, BWP) of the terminal device in the first communications system to a transmit frequency and a transmit bandwidth or a start frequency and an end frequency that do not interfere with the second communications system. Alternatively, the network device reduces transmit power of the first communications system based on the first IDC interference adjustment information.

For example, an operating frequency of the terminal device in the Wi-Fi communications system is 100 MHZ, and the operating bandwidth of the terminal device in the Wi-Fi communications system is 200 MHz. The first IDC interference adjustment information includes a frequency 50 MHz and a bandwidth 40 MHz at which the terminal device is interfered with by the cellular communications system in the Wi-Fi communications system. Alternatively, a start frequency at which the terminal device is interfered with by the cellular communications system in the Wi-Fi communications system is 30 MHZ, and an end frequency at which the terminal device is interfered with by the cellular communications system in the Wi-Fi communications system is 70 MHz. The network device adjusts, based on the first IDC interference adjustment information, the frequency and the bandwidth of the terminal device in the Wi-Fi communications system to a frequency and a bandwidth that are not interfered with by the cellular communications system, or adjusts the start frequency and the end frequency of the terminal device in the Wi-Fi communications system to a start frequency and an end frequency that are not interfered with by the cellular communications system. For example, the network device adjusts the operating frequency of the terminal device in the Wi-Fi communications system to 200 MHZ, and the bandwidth remains unchanged, or adjusts the operating start frequency of the terminal device in the Wi-Fi communications system to 100 MHZ, and adjusts the operating end frequency of the terminal device in the Wi-Fi communications system to 300 MHz. Alternatively, the operating bandwidth allocated by the network device to the terminal device in the Wi-Fi communications system is reduced. In other words, the operating bandwidth of the terminal device in the Wi-Fi communications system is adjusted from original 200 MHz to 130 MHz, and the operating frequency of the terminal device in the Wi-Fi communications system is adjusted from 100 MHz to 135 MHz. In this way, the terminal device is not interfered with by the cellular communications system in the Wi-Fi communications system, and can normally receive data.

Optionally, the network device calculates a magnitude of interference between communications systems based on the frequency bandwidth information included in the first IDC interference, so that transmit power of the terminal device in the cellular communications system can be appropriately reduced based on the magnitude of the interference, to reduce IDC interference and improve data transmission reliability.

Optionally, the network device determines, based on the frequency band information included in the first IDC interference adjustment information, an overlapping size or an interval size between a frequency band at which the second communications system of the terminal device is interfered with by the terminal device in the first communications system and an operating frequency band of the terminal device in the second communications system, to determine a reduction amplitude of the transmit power of the terminal device in the first communications system. Larger overlapping or a smaller interval indicates a larger reduction amplitude of the transmit power, and smaller overlapping or a larger interval indicates a smaller reduction amplitude of the transmit power.

For example, when the cellular communications system is the interference source, the operating frequency of the terminal device in the Wi-Fi communications system is 100 MHZ, and the bandwidth of the terminal device in the Wi-Fi communications system is 200 MHz. In a scenario 1, the operating frequency at which the terminal device is interfered with by the cellular communications system in the Wi-Fi communications system is 150 MHz, and the bandwidth at which the terminal device is interfered with by the cellular communications system in the Wi-Fi communications system is 100 MHz. In a scenario 2, the operating frequency at which the terminal device is interfered with by the cellular communications system in the Wi-Fi communications system is 150 MHZ, and the bandwidth at which the terminal device is interfered with by the cellular communications system in the Wi-Fi communications system is 50 MHz. By comparison, overlapping between a frequency band at which the terminal device is interfered with by the cellular communications system in the Wi-Fi communications system and the operating band of the terminal device in the Wi-Fi communications system in the scenario 2 is less than overlapping between a frequency band at which the terminal device is interfered with by the cellular communications system in the Wi-Fi communications system and the operating band of the terminal device in the Wi-Fi communications system in the scenario 1. In other words, interference impact of the cellular communications system on the terminal device in the Wi-Fi communications system in the scenario 2 is less than the interference of the cellular communications system on the terminal device in the Wi-Fi communications system in the scenario 1. Therefore, a reduction amplitude of the transmit power of the terminal device in the cellular communications system in the scenario 2 is less than a reduction amplitude of the transmit power of the terminal device in the cellular communications system in the scenario 1. In other words, larger overlapping indicates a larger interference impact degree and a larger reduction amplitude of the transmit power of the terminal device in the first communications system.

In addition, when the cellular communications system is the interference source, the operating frequency of the terminal device in the cellular communications system is 100 MHZ, and the bandwidth of the terminal device in the cellular communications system is 200 MHZ. In the scenario 1, the operating frequency of the terminal device in the Wi-Fi communications system is 300 MHz, and the bandwidth of the terminal device in the Wi-Fi communications system is 200 MHz. In the scenario 2, the operating frequency of the terminal device in the Wi-Fi communications system is 350 MHz, and the bandwidth of the terminal device in the Wi-Fi communications system is 200 MHz. By comparison, an interval between the operating frequency band of the terminal device in the cellular communications system and the operating frequency band of the terminal device in the Wi-Fi communications system in the scenario 2 is greater than an interval between the operating frequency band of the terminal device in the cellular communications system and the operating frequency band of the terminal device in the Wi-Fi communications system in the scenario 1. Therefore, compared with the scenario 2, in the scenario 1, the terminal device in the cellular communications system and the terminal device in the Wi-Fi communications system are more likely to cause adjacent-channel interference to each other. Therefore, a reduction amplitude the transmit power of the terminal device in the cellular communications system in the scenario 2 is less than a reduction amplitude of the transmit power of the terminal device in the cellular communications system in the scenario 1. In other words, a smaller interval indicates a larger impact degree of the adjacent-channel interference and a larger reduction amplitude of the transmit power of the terminal device in the cellular communications system.

Optionally, when the first communications system is the interference source, the network device switches, based on the first IDC interference adjustment information, a receive frequency and a receive bandwidth or a start frequency and an end frequency of the terminal device in the first communications system to a frequency and a bandwidth or a start frequency and an end frequency that are not interfered with by the second communications system. Alternatively, the network device switches, based on the first IDC interference adjustment information, a transmit frequency and a transmit bandwidth or a start frequency and an end frequency of the first communications system for the terminal device to a frequency and a bandwidth or a start frequency and an end frequency that are not interfered with by the second communications system. Alternatively, the network device switches, based on the first IDC interference adjustment information, a downlink BWP of the terminal device in the first communications system to a receive frequency and a receive bandwidth or a start frequency and an end frequency that are not interfered with by the second communications system.

For example, the operating frequency of the terminal device in the cellular communications system is 100 MHZ, and the operating bandwidth of the terminal device in the cellular communications system is 200 MHz. The first IDC interference adjustment information includes a frequency 50 MHz and a bandwidth 40 MHz at which the terminal device is interfered with by the Wi-Fi communications system in the cellular communications system, or a start frequency 30 MHz and an end frequency 70 MHz at which the terminal device is interfered with by the Wi-Fi communications system in the cellular communications system. The network device adjusts, based on the first IDC interference adjustment information, the frequency and the bandwidth of the terminal device in the cellular communications system to a frequency and a bandwidth that are not interfered with by the Wi-Fi communications system, or adjusts the start frequency and the end frequency of the terminal device in the cellular communications system to a start frequency and an end frequency that are not interfered with by the Wi-Fi communications system. For example, the network device adjusts the operating frequency of the terminal device in the cellular communications system to 200 MHz, and the bandwidth remains unchanged, or adjusts the operating start frequency of the terminal device in the cellular communications system to 100 MHz, and adjusts the operating end frequency of the terminal device in the cellular communications system to 300 MHz. Alternatively, the operating bandwidth allocated by the network device to the terminal device in the cellular communications system is reduced. In other words, the operating bandwidth of the terminal device in the Wi-Fi communications system is adjusted from original 200 MHz to 130 MHz, and the operating frequency of the terminal device in the Wi-Fi communications system is adjusted from 100 MHz to 135 MHz. In this way, the terminal device is not interfered with by the Wi-Fi communications system in the cellular communications system, and can normally receive data.

Optionally, the network device calculates a magnitude of interference between communications systems based on the frequency bandwidth information included in the first IDC interference, so that transmit power of the network device can be appropriately increased based on the magnitude of the interference, to reduce IDC interference and improve data transmission reliability.

Optionally, the network device determines, based on the frequency band information included in the first IDC interference adjustment information, an overlapping size or an interval size between a frequency band at which the terminal device is interfered with by the second communications system of the terminal device in the first communications system and an operating frequency band of the terminal device in the first communications system, to determine an increase amplitude of the transmit power of the network device in the first communications system. Larger overlapping or a closer interval indicates a larger increase amplitude of the transmit power, and smaller overlapping or a longer interval indicates a smaller increase amplitude of the transmit power. For example, when the cellular communications system is the interfered source, the operating frequency of the terminal device in the cellular communications system is 100 MHZ, and the bandwidth of the terminal device in the cellular communications system is 200 MHZ. In a scenario 1, the operating frequency at which the terminal device is interfered with by the Wi-Fi communications system in the cellular communications system is 150 MHz, and the bandwidth at which the terminal device is interfered with by the Wi-Fi communications system in the cellular communications system is 100 MHz. In a scenario 2, the operating frequency at which the terminal device is interfered with by the Wi-Fi communications system in the cellular communications system is 150 MHz, and the bandwidth at which the terminal device is interfered with by the Wi-Fi communications system in the cellular communications system is 50 MHz. By comparison, overlapping between a frequency band at which the terminal device is interfered with by the Wi-Fi communications system in the cellular communications system and the operating band of the terminal device in the cellular communications system in the scenario 2 is less than overlapping between a frequency band at which the terminal device is interfered with by the Wi-Fi communications system in the cellular communications system and the operating band of the terminal device in the cellular communications system in the scenario 1. In other words, interference impact of the Wi-Fi communications system on the terminal device in the cellular communications system in the scenario 2 is less than the interference of the Wi-Fi communications system on the terminal device in the cellular communications system in the scenario 1. Therefore, an increase amplitude of the transmit power of the network device in the cellular communications system in the scenario 2 is less than an increase amplitude of the transmit power of the network device in the cellular communications system in the scenario 1. In other words, larger overlapping indicates a larger interference impact degree and a larger increase amplitude of the transmit power of the network device in the first communications system.

In addition, when the cellular communications system is the interfered source, the operating frequency of the terminal device in the cellular communications system is 100 MHZ, and the bandwidth of the terminal device in the cellular communications system is 200 MHZ. In the scenario 1, the operating frequency of the terminal device in the Wi-Fi communications system is 300 MHz, and the bandwidth of the terminal device in the Wi-Fi communications system is 200 MHz. In the scenario 2, the operating frequency of the terminal device in the Wi-Fi communications system is 350 MHz, and the bandwidth of the terminal device in the Wi-Fi communications system is 200 MHz. By comparison, an interval between the operating frequency band of the terminal device in the cellular communications system and the operating frequency band of the terminal device in the Wi-Fi communications system in the scenario 2 is greater than an interval between the operating frequency band of the terminal device in the cellular communications system and the operating frequency band of the terminal device in the Wi-Fi communications system in the scenario 1. Therefore, compared with the scenario 2, in the scenario 1, the terminal device in the cellular communications system and the terminal device in the Wi-Fi communications system are more likely to cause adjacent-channel interference to each other. Therefore, an increase amplitude the transmit power of the network device in the cellular communications system in the scenario 2 is less than an increase amplitude of the transmit power of the network device in the cellular communications system in the scenario 1. In other words, a smaller interval indicates a larger impact degree of the adjacent-channel interference and a larger increase amplitude of the transmit power of the network device in the cellular communications system.

In this embodiment of this application, the terminal device sends the first IDC interference adjustment information to the network device, and the first IDC interference adjustment information includes the frequency bandwidth information. The terminal device sends the first IDC interference adjustment information to the network device, and the network device adjusts IDC interference based on the frequency bandwidth information in the first IDC interference adjustment information, to reduce IDC interference of the terminal device and improve data transmission reliability.

Figure 4:
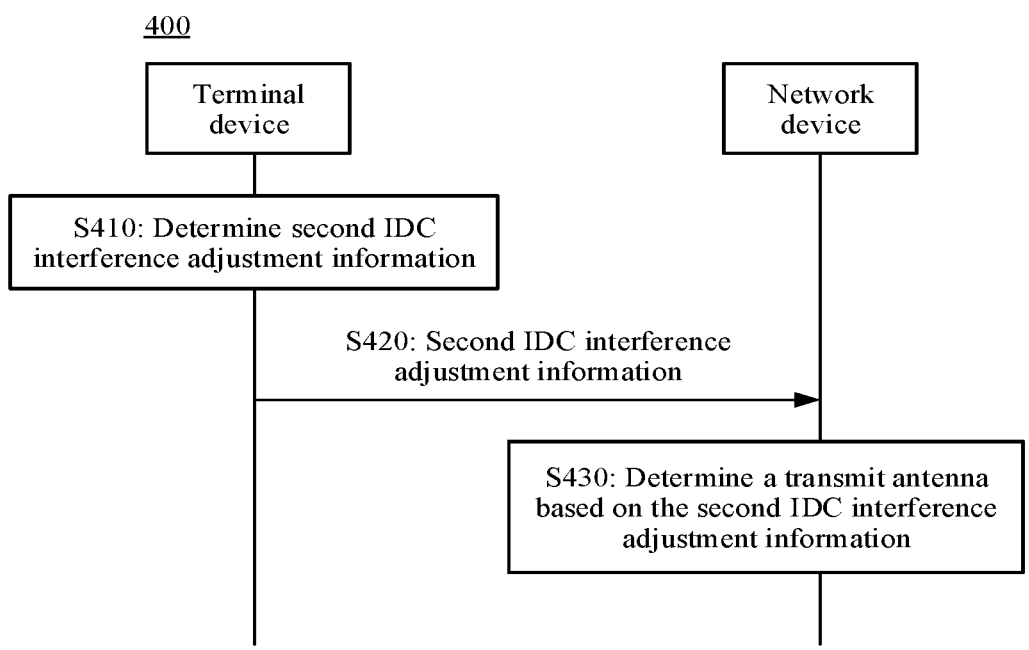
FIG. 4 is a schematic flowchart of a communication method according to another embodiment of this application.

FIG. 4 shows a communication method 400 according to an embodiment of this application. The following describes steps in the method 400 in detail with reference to FIG. 4.

It should be understood that in this embodiment of this application, the method 400 is described by using an example in which the method 400 is performed by a terminal device and a network device. By way of example, and not limitation, the method 400 may alternatively be performed by a chip used in a terminal device and a chip used in a network device.

S410: The terminal device determines second in-device coexistence IDC interference adjustment information.

In practice, interference of the terminal device may affect only a fixed antenna. For example, antenna isolation of a historical product is poor. When a dominant frequency operates, a third harmonic is excessively large. When B5/8/20/26 operates, the B5/8/20/26 interferes with a Wi-Fi 2.4 G frequency band. Therefore, when these frequency bands operate, a transmit antenna is switched to an upper antenna.

Before switching the transmit antenna, the terminal device needs to determine the second IDC interference adjustment information that includes antenna interference adjustment information. In a current protocol, an antenna selection base station usually configures uplink reference signal resources (sounding reference signal resource, SRS resource) of two codebooks (codebook), and each SRS resource corresponds to a different antenna. For example, an SRS resource 1 corresponds to an antenna #1, and the SRS resource 1 corresponds to an antenna #2.

During initial access of a mobile phone, the network device may configure a plurality of SRS resources, so that the terminal device sends the SRSs in turn. Each SRS resource corresponds to a different antenna port (port), and each antenna port may be mapped to a corresponding physical antenna. Then, the network device indicates, by using an uplink reference signal resource indicator (SRS resource indicator, SRI) in a downlink control signal (downlink control information, DCI), an SRS resource used by the terminal device to send a physical uplink shared channel (physical uplink shared channel, PUSCH). In other words, the network device indicates, by using the DCI, an antenna used by the terminal device as the transmit antenna.

When interference coexists in the terminal device, the terminal device determines the second IDC interference adjustment information, and the second IDC interference adjustment information includes an SRS resource indicator (SRS resource index) corresponding to an interfered antenna or an SRS resource indicator corresponding to an antenna that is not interfered with.

Optionally, if an antenna port number may be explicitly indicated in the protocol, the second IDC interference adjustment information may directly include a port number of the interfered antenna or a port number of the antenna that is not interfered with.

S420: The terminal device sends the second IDC interference adjustment information to the network device.

After determining the second IDC interference adjustment information carrying interference antenna information, the terminal device sends the second IDC interference adjustment information to the network device, and the second IDC interference adjustment information is used to indicate the network device to determine the transmit antenna of the terminal device.

S430: The network device determines the transmit antenna based on the second IDC interference adjustment information.

The network device receives the second IDC interference adjustment information sent by the terminal device, and determines the transmit antenna based on the second IDC interference adjustment information.

For example, the second IDC interference adjustment information includes the SRS resource indicator corresponding to the interfered antenna, and the network device determines the interfered antenna according to a correspondence between the SRS resource indicator and the antenna.

Alternatively, the second IDC interference adjustment information includes the SRS resource indicator corresponding to the antenna that is not interfered with, and the network device determines the antenna that is not interfered with according to a correspondence between the SRS resource indicator and the antenna.

Alternatively, the second IDC interference adjustment information may include an antenna port number. The network device determines the interfered antenna according to the port number that is of the interfered antenna and that is included in the second IDC interference adjustment information, or the network device determines the antenna that is not interfered with according to the port number that is of the antenna that is not interfered with and that is included in the second IDC interference adjustment information.

Figure 5:
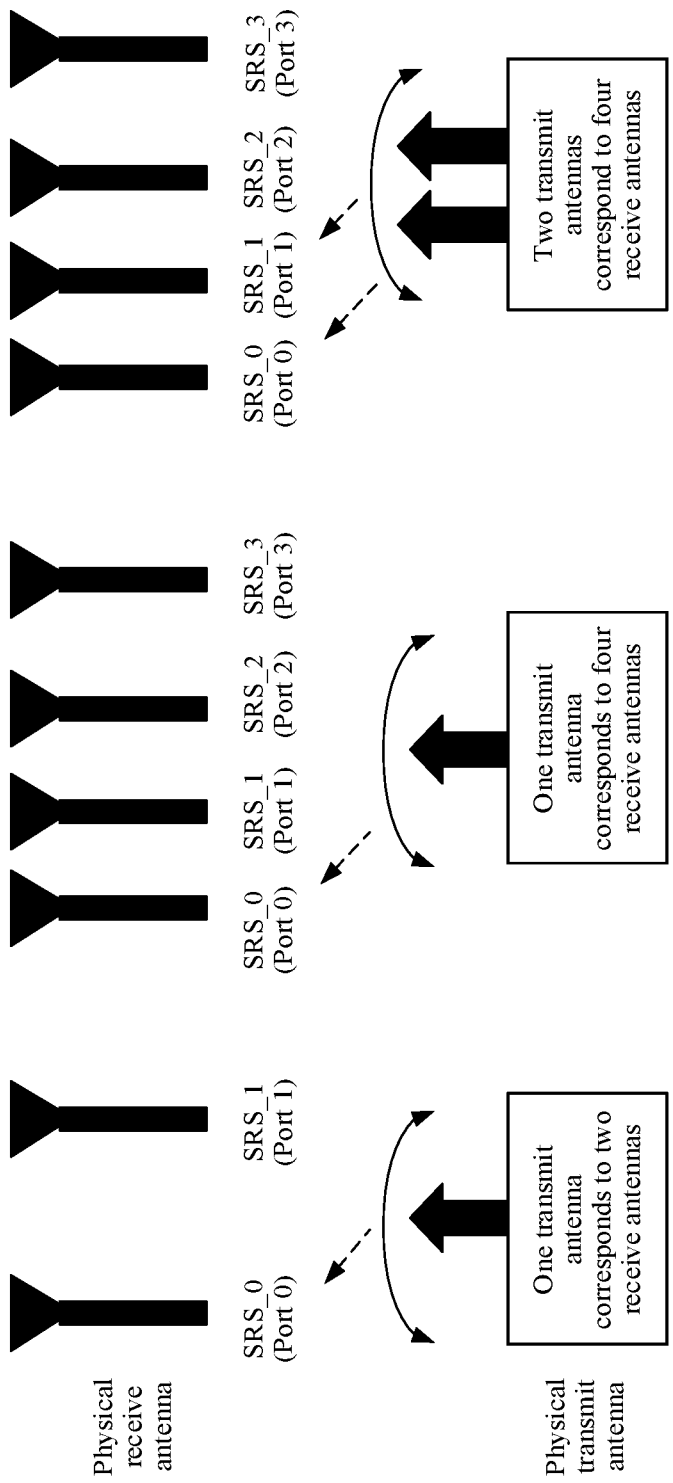
FIG. 5 is a schematic diagram of a correspondence between a transmit antenna and a receive antenna of a terminal device.

FIG. 5 shows a correspondence between a transmit antenna and a receive antenna. As shown in FIG. 5, during initial access of the mobile phone, the terminal device sends SRSs in turn. When one transmit antenna corresponds to two receive antennas, in other words, an SRS transmitted by the terminal device may be received by the two receive antennas, the terminal device determines that an SRS resource indicator corresponding to the interfered antenna is an SRS_1, uses the SRS resource indicator SRS_1 corresponding to the interfered antenna as the second IDC interference adjustment information, and sends the second IDC interference adjustment information to the network device. The network device determines, based on the second IDC interference adjustment information sent by the terminal device, that the transmit antenna of the terminal device is an antenna corresponding to an SRS_0. Alternatively, the terminal device determines that a port of the interfered antenna is a port 1, uses the port (namely, the port 1) of the interfered antenna as the second IDC interference adjustment information, and sends the second IDC interference adjustment information to the network device. The network device determines, based on the second IDC interference adjustment information sent by the terminal device, that the transmit antenna of the terminal device is an antenna corresponding to a port 0. When two transmit antennas correspond to four receive antennas, in other words, SRSs transmitted by the terminal device may be received by the four receive antennas, the terminal device determines that SRS resource indicators corresponding to interfered antennas are an SRS_2 and an SRS_3, uses the SRS resource indicators SRS_2 and SRS_3 corresponding to the interfered antennas as the second IDC interference adjustment information, and sends the second IDC interference adjustment information to the network device. The network device determines, based on the second IDC interference adjustment information sent by the terminal device, that transmit antennas of the terminal device are antennas corresponding to an SRS_0 and an SRS_1. Alternatively, the terminal device determines that ports of the interfered antennas are a port 2 and a port 3, uses the ports (namely, the port 2 and the port 3) of the interfered antennas as the second IDC interference adjustment information, and sends the second IDC interference adjustment information to the network device. The network device determines, based on the second IDC interference adjustment information sent by the terminal device, that the transmit antennas of the terminal device are antennas corresponding to a port 0 and a port 1.

In the foregoing technical solution, the network device receives the second IDC interference adjustment information sent by the terminal device, and determines, based on the second IDC interference adjustment information, that the antenna that is not interfered with is the transmit antenna of the terminal device, to reduce IDC interference and improve data transmission reliability.

The network device uses, based on the determined antenna that is not interfered with, the antenna that is not interfered with as the transmit antenna, or schedules, based on an uplink antenna, the PUSCH to be transmitted on the port of the antenna that is not interfered with.

In this embodiment of this application, the terminal device determines the second IDC interference adjustment information that includes information about the antenna that is not interfered with or information about the interfered antenna, and sends the determined second IDC interference adjustment information to the network device. The network device uses the antenna that is not interfered with as the transmit antenna based on the received second IDC interference adjustment information. The network device does not need to avoid interference in an FDM manner or a TDM manner, but directly determines the antenna that is not interfered with to avoid IDC interference. This improves data transmission reliability.

The foregoing describes in detail examples of the communication method provided in this application. It may be understood that, to implement the foregoing functions, the terminal device and the network device include corresponding hardware structures or software modules or hardware structures and software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

With reference to FIG. 6 to FIG. 9, the following describes in detail a communication apparatus provided in this application.

Figure 6:
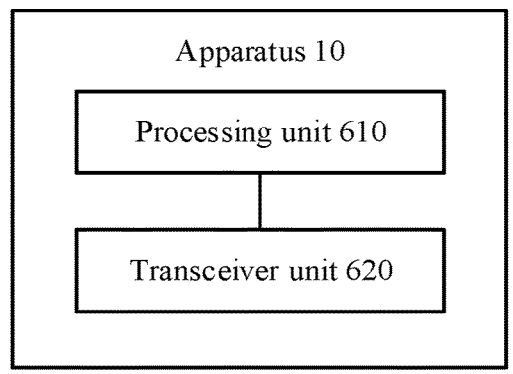
FIG. 6 is a schematic block diagram of a communication apparatus according to an embodiment of this application.

FIG. 6 is a schematic diagram of a communication apparatus 10 according to this application. As shown in FIG. 6, the apparatus 10 includes a processing unit 610 and a transceiver unit 620.

In some possible implementations, the apparatus 10 may be a terminal device corresponding to a method 300.

The processing unit 610 is configured to determine first in-device coexistence IDC interference adjustment information, and the first IDC interference adjustment information includes frequency bandwidth information.

The transceiver unit 620 is configured to send the first IDC interference adjustment information to a network device.

In the foregoing technical solution, the terminal device determines the first IDC interference adjustment information that includes the frequency bandwidth information, and sends the first IDC interference adjustment information to the network device. The network device adjusts IDC interference based on the frequency bandwidth information included in the first IDC interference adjustment information, namely, the frequency band information, to reduce IDC interference and improve data transmission reliability.

Optionally, the processing unit 610 is specifically configured to: when a first communications system of the terminal device is an interference source, determine that a frequency and a bandwidth or a start frequency and an end frequency at which the terminal device is interfered with by the first communications system in a second communications system are the first IDC interference adjustment information; or when a first communications system of the terminal device is an interference source, determine that a frequency and a bandwidth or a start frequency and an end frequency at which the terminal device is not interfered with by the first communications system in a second communications system are the first IDC interference adjustment information; or when a first communications system of the terminal device is an interference source, determine that an operating frequency and an operating bandwidth or an operating start frequency and an operating end frequency of the terminal device in a second communications system are the first IDC interference adjustment information.

Optionally, the processing unit 610 is further configured to: when a first communications system of the terminal device is an interfered source, determine that a frequency and a bandwidth or a start frequency and an end frequency at which the terminal device is interfered with by a second communications system of the terminal device in the first communications system are the first IDC interference adjustment information; or when a first communications system of the terminal device is an interfered source, determine that a frequency and a bandwidth or a start frequency and an end frequency at which the terminal device is not interfered with by a second communications system of the terminal device in the first communications system are the first IDC interference adjustment information; or when a first communications system of the terminal device is an interference source, determine that an operating frequency and an operating bandwidth or an operating start frequency and an operating end frequency of the terminal device in a second communications system are the first IDC interference adjustment information.

In some possible implementations, the apparatus 10 may be a terminal device corresponding to a method 400.

The processing unit 610 is configured to determine second in-device coexistence IDC interference adjustment information, and the second IDC interference adjustment information includes information indicating that the terminal device interferes with or does not interfere with, in a first communications system, an antenna of a second communications system of the terminal device.

The transceiver unit 620 is configured to send the second IDC interference adjustment information to a network device.

In the foregoing technical solution, the terminal device sends, to the network device, the determined second IDC interference adjustment information that includes the information indicating that the terminal device interferes with or does not interfere with, in the first communications system, the antenna of the second communications system of the terminal device, and the network device adjusts IDC interference, to reduce the IDC interference and improve data transmission reliability.

Optionally, the second IDC interference adjustment information includes at least one piece of the following information: port information indicating that the terminal device interferes with, in the first communications system, a transmit antenna of the second communications system; or port information indicating that the terminal device does not interfere with, in the first communications system, a transmit antenna of the second communications system; or uplink reference signal resource SRS resource information indicating that the terminal device interferes with, in the first communications system, a transmit antenna of the second communications system; or uplink reference signal resource SRS resource information indicating that the terminal device does not interfere with, in the first communications system, a transmit antenna of the second communications system.

Figure 7:
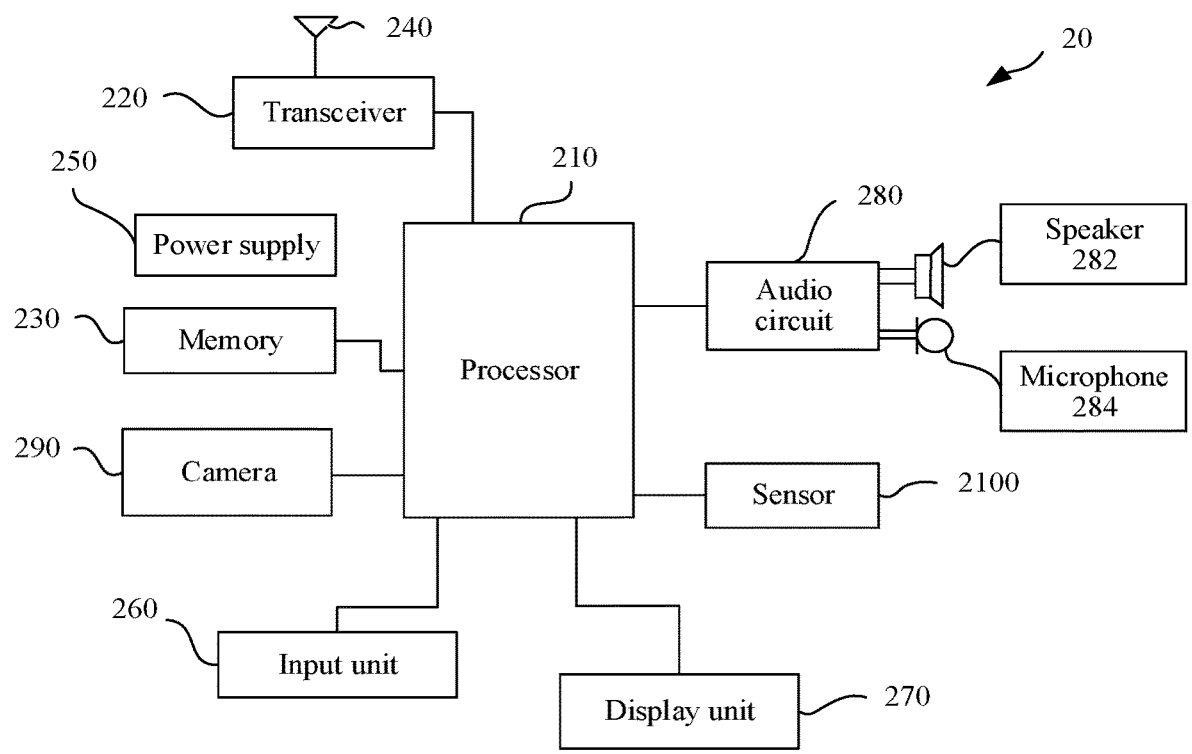
FIG. 7 is a schematic structural diagram of a terminal device according to an embodiment of this application.

FIG. 7 is a schematic structural diagram of a terminal device 20 applicable to an embodiment of this application. For ease of description, FIG. 7 shows only main components of the terminal device. As shown in FIG. 7, the terminal device 20 includes a processor, a memory, a control circuit, an antenna, and an input/output apparatus. The processor is configured to control the antenna and the input/output apparatus to send and receive a signal. The memory is configured to store a computer program. The processor is configured to invoke the computer program from the memory and run the computer program, to perform a corresponding procedure or operation or a corresponding procedure and operation performed by the terminal device in the communication method provided in this application. Details are not described herein.

A person skilled in the art may understand that, for ease of description, FIG. 7 shows only one memory and one processor. An actual terminal device may have a plurality of processors and a plurality of memories. The memory may also be referred to as a storage medium, a storage device, or the like. This is not limited in the embodiments of this application.

Figure 8:
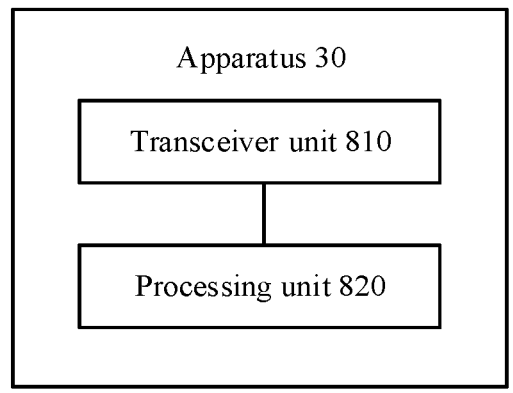
FIG. 8 is a schematic block diagram of a communication apparatus according to an embodiment of this application.

FIG. 8 is a schematic diagram of a communication apparatus 30 according to this application. As shown in FIG. 8, the apparatus 30 includes a transceiver unit 810 and a processing unit 820.

In some possible implementations, the apparatus 30 may be a network device corresponding to a method 300.

The transceiver unit 810 is configured to receive first in-device coexistence IDC interference adjustment information sent by a terminal device, and the first IDC interference adjustment information includes frequency bandwidth information.

The processing unit 820 is configured to adjust IDC interference based on the first IDC interference adjustment information.

In the foregoing technical solution, the network device receives the first IDC interference adjustment information that is sent by the terminal device and that includes the frequency bandwidth information, and adjusts the IDC interference based on the first IDC interference adjustment information, to reduce the IDC interference and improve data transmission reliability.

Optionally, when a first communications system of the terminal device is an interference source, the first IDC interference adjustment information is a frequency and a bandwidth or a start frequency and an end frequency at which a second communications system of the terminal device is interfered with by the terminal device in the first communications device; or when a first communications system of the terminal device is an interference source, the first IDC interference adjustment information is a frequency and a bandwidth or a start frequency and an end frequency at which a second communications system of the terminal device is not interfered with by the terminal device in the first communications device; or when a first communications system of the terminal device is an interference source, the first IDC interference adjustment information is an operating frequency and an operating bandwidth or an operating start frequency and an operating end frequency of the terminal device in a second communications system.

Optionally, when a first communications system of the terminal device is an interfered source, the first IDC interference adjustment information is a frequency and a bandwidth or a start frequency and an end frequency at which a second communications system of the terminal device interferes with the terminal device in the first communications system; or when a first communications system of the terminal device is an interfered source, the first IDC interference adjustment information is a frequency and a bandwidth or a start frequency and an end frequency at which a second communications system of the terminal device does not interfere with the terminal device in the first communications system; or when a first communications system of the terminal device is an interfered source, the first IDC interference adjustment information is an operating frequency and an operating bandwidth or an operating start frequency and an operating end frequency of the terminal device in a second communications system.

Optionally, the processing unit 820 is specifically configured to: switch, based on the first IDC interference adjustment information, a transmit frequency and a transmit bandwidth or a transmit start frequency and a transmit end frequency of the terminal device in the first communications system to the frequency and the bandwidth or the start frequency and the end frequency at which the second communications system is not interfered with; or switch, based on the first IDC interference adjustment information, a transmit frequency and a transmit bandwidth or a transmit start frequency and a transmit end frequency for the terminal device in the first communications system to the frequency and the bandwidth or the start frequency and the end frequency at which the second communications system is not interfered with; or switch, based on the first IDC interference adjustment information, an uplink bandwidth part BWP of the terminal device in the first communications system to a transmit frequency and a transmit bandwidth or a transmit start frequency and a transmit end frequency at which the second communications system is not interfered with; or reduce transmit power of the first communications system based on the first IDC interference adjustment information.

Optionally, the processing unit 820 is further configured to determine a magnitude of interference based on the first IDC interference adjustment information, and reduce the transmit power of the first communications system of the terminal device based on the magnitude of interference.

Optionally, the network device determines, based on the frequency band information included in the first IDC interference adjustment information, an overlapping size or an interval size between a frequency band at which the second communications system of the terminal device is interfered with by the terminal device in the first communications system and an operating frequency band of the terminal device in the second communications system, to determine a reduction amplitude of the transmit power of the first communications system of the terminal device. Larger overlapping or a closer interval indicates a larger reduction amplitude, and smaller overlapping or a longer interval indicates a smaller reduction amplitude.

Optionally, the processing unit 820 is further configured to: switch, based on the first IDC interference adjustment information, a receive frequency and a receive bandwidth or a receive start frequency and a receive end frequency of the terminal device in the first communications system to the frequency and the bandwidth or the start frequency and the end frequency that are not interfered with by the second communications system; or switch, based on the first IDC interference adjustment information, a transmit frequency and a transmit bandwidth or a transmit start frequency and a transmit end frequency of the first communications system for the terminal device to the frequency and the bandwidth or the start frequency and the end frequency that are not interfered with by the second communications system; or switch, based on the first IDC interference adjustment information, a downlink BWP of the terminal device in the first communications system to a receive frequency and a receive bandwidth or a receive start frequency and a receive end frequency that are not interfered with by the second communications system; or increase transmit power of the network device based on the first IDC interference adjustment information.

Optionally, the processing unit 820 is further configured to determine a magnitude of interference based on the first IDC interference adjustment information, and increase the transmit power of the network device based on the magnitude of interference.

Optionally, the network device determines, based on the frequency band information included in the first IDC interference adjustment information, an overlapping size or an interval size between a frequency band at which the terminal device is interfered with by the second communications system of the terminal device in the first communications system and an operating frequency band of the terminal device in the first communications system, to determine an increase amplitude of the transmit power of the network device. Larger overlapping or a closer interval indicates a larger increase amplitude, and smaller overlapping or a longer interval indicates a smaller increase amplitude.

In some possible implementations, the apparatus 30 may be a network device corresponding to a method 400.

The transceiver unit 810 is configured to receive second in-device coexistence IDC interference adjustment information sent by a terminal device, and the second IDC interference adjustment information includes information indicating that the terminal device interferes with or does not interfere with, in a first communications system, an antenna of a second communications system of the terminal device.

The processing unit 820 is configured to determine a transmit antenna of the terminal device based on the second IDC interference adjustment information.

In the foregoing technical solution, the network device receives the second IDC interference adjustment information that is determined by the terminal device and that includes the information indicating that the terminal device interferes with or does not interfere with, in the first communications system, the antenna of the second communications system of the terminal device, and adjusts IDC interference based on the second IDC interference adjustment information, to reduce the IDC interference and improve data transmission reliability.

Optionally, the second IDC interference adjustment information includes at least one piece of the following information: port information indicating that the terminal device interferes with, in the first communications system, a transmit antenna of the second communications system; or port information indicating that the terminal device does not interfere with, in the first communications system, a transmit antenna of the second communications system; or uplink reference signal resource SRS resource information indicating that the terminal device interferes with, in the first communications system, a transmit antenna of the second communications system; or uplink reference signal resource SRS resource information indicating that the terminal device does not interfere with, in the first communications system, a transmit antenna of the second communications system.

Optionally, the processing unit 820 is configured to determine, based on the second IDC interference adjustment information, that an uplink transmit antenna of the terminal device in the first communications system is an antenna that does not interfere with the second communications system; or schedule, based on the second IDC interference adjustment information, a physical uplink shared channel PUSCH to be transmitted on an antenna that is in the first communications system and that does not interfere with the second communications system.

Optionally, the transceiver unit 810 is configured to send information about the transmit antenna of the terminal device in the first communications system to the terminal device by using a downlink control signal DCI.

Optionally, the network device indicates the information about the transmit antenna of the terminal device in the first communications system by using an SRI in the DCI.

During initial access of a mobile phone, the network device may configure a plurality of SRS resources, so that the terminal device sends the SRSs in turn. Each SRS resource corresponds to a different antenna port (port), and each antenna port may be mapped to a corresponding physical antenna. Then, the network device indicates, by using the SRI in the DCI, an SRS resource used by the terminal device to send the physical uplink shared channel PUSCH. In other words, the network device indicates, by using the DCI, an antenna used by the terminal device as the transmit antenna in the first communications system.

Figure 9:
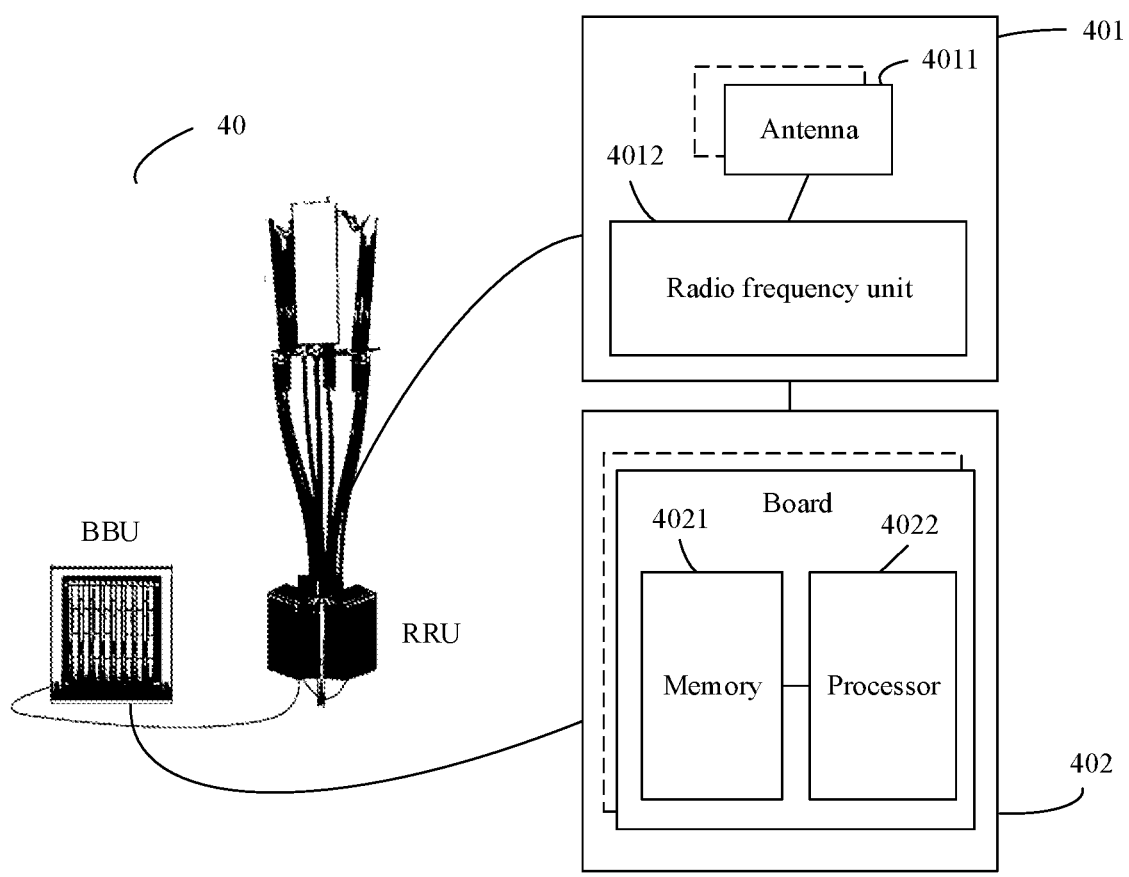
FIG. 9 is a schematic structural diagram of a network device according to an embodiment of this application.

FIG. 9 is a schematic structural diagram of a network device 40 applicable to an embodiment of this application. The network device 40 may be configured to implement functions of the network device in the foregoing reference signal transmission method. For example, FIG. 9 may be a schematic structural diagram of a base station.

The network device 40 may include one or more radio frequency units, for example, a remote radio unit (remote radio unit, RRU) 401 and one or more baseband units (base band unit, BBU). The baseband unit may also be referred to as a digital unit (digital unit, DU) 402. The RRU 401 may be referred to as a transceiver unit, and corresponds to the transceiver unit 810 in FIG. 8. Optionally, the transceiver unit 401 may also be referred to as a transceiver, a transceiver circuit, a transceiver, or the like, and may include at least one antenna 4011 and a radio frequency unit 4012. Optionally, the transceiver unit 401 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 401 is mainly configured to receive and send a radio frequency signal and perform conversion between the radio frequency signal and a baseband signal, for example, configured to send a first mapping relationship to a terminal device. The BBU 402 is mainly configured to perform baseband processing, control the base station, and the like. The RRU 401 and the BBU 402 may be physically disposed together, or may be physically disposed separated, namely, a distributed base station.

The BBU 402 is a control center of the network device, may also be referred to as a processing unit, may correspond to the processing unit 820 in FIG. 8, and is mainly configured to complete baseband processing functions such as channel coding, multiplexing, modulation, and spectrum spreading. For example, the BBU (the processing unit) 402 may be configured to control the network device 40 to perform an operation procedure related to the network device in the foregoing method embodiment, for example, adjust IDC interference based on the first IDC interference adjustment information.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store necessary instructions and necessary data. For example, the memory 4021 stores the codebook and the like in the foregoing embodiments. The processor 4022 is configured to control the base station to perform a necessary action, for example, control the base station to perform the operation procedure related to the network device in the foregoing method embodiments. The memory 4021 and the processor 4022 may serve the one or more boards. To be specific, a memory and a processor may be disposed on each board, or a plurality of boards may share a same memory and processor. In addition, a necessary circuit may further be disposed on each board.

It should be understood that the network device 40 shown in FIG. 9 can implement functions of the network device in the method embodiments in FIG. 3 and FIG. 4. Operations or functions of the units in the network device 40 are separately used to implement corresponding procedures performed by the network device in the method embodiments of this application. To avoid repetition, detailed descriptions are appropriately omitted herein. The structure of the network device shown in FIG. 9 is merely a possible form, and should not constitute any limitation on this embodiment of this application. This application does not exclude a possibility that another form of network device structure may appear in the future.

An embodiment of this application further provides a communications system, including the foregoing network device and one or more terminal devices.

This application further provides a computer-readable storage medium. The computer-readable storage medium stores instructions. When the instructions are run on a computer, the computer is enabled to perform the steps performed by the terminal device in the methods shown in FIG. 3 and FIG. 4.

This application further provides a computer-readable storage medium. The computer-readable storage medium stores instructions. When the instructions are run on a computer, the computer is enabled to perform the steps performed by the network device in the methods shown in FIG. 3 and FIG. 4.

This application further provides a computer program product including instructions. When the computer program product runs on a computer, the computer is enabled to perform the steps performed by the terminal device in the methods shown in FIG. 3 and FIG. 4.

This application further provides a computer program product including instructions. When the computer program product runs on a computer, the computer is enabled to perform the steps performed by the network device in the methods shown in FIG. 3 and FIG. 4.

This application further provides a chip, including a processor. The processor is configured to read and run the computer program stored in a memory, to perform a corresponding operation or procedure or an operation and procedure performed by the terminal device in the communication method provided in this application. Optionally, the chip further includes the memory. The memory is connected to the processor through a circuit or a cable. The processor is configured to read and execute the computer program in the memory. Optionally, the chip further includes a communications interface. The processor is connected to the communications interface. The communications interface is configured to receive data or information that needs to be processed or data and information that need to be processed. The processor obtains the data or information or the data and information from the communications interface, and processes the data or information or the data and information. The communications interface may be an input/output interface.

This application further provides a chip, including a processor. The processor is configured to invoke and run the computer program stored in the memory, to perform a corresponding operation or procedure or an operation and procedure performed by the network device in the communication method provided in this application. Optionally, the chip further includes the memory. The memory is connected to the processor through a circuit or a cable. The processor is configured to read and execute the computer program in the memory. Optionally, the chip further includes a communications interface. The processor is connected to the communications interface. The communications interface is configured to receive data or information that needs to be processed or data and information that need to be processed. The processor obtains the data or information or the data and information from the communications interface, and processes the data or information or the data and information. The communications interface may be an input/output interface.

In the foregoing embodiments, the processor may be a central processing unit (central processing unit, CPU), a microprocessor, an application-specific integrated circuit (application-specific integrated circuit, ASIC), one or more integrated circuits for controlling program execution in the technical solutions of this application, or the like. For example, the processor may be a digital signal processor device, a microprocessor device, an analog-to-digital converter, and a digital-to-analog converter. The processor may allocate control and signal processing functions of the terminal device or the network device between these devices based on respective functions of these devices. In addition, the processor may have a function of operating one or more software programs. The software programs may be stored in a memory. The functions of the processor may be implemented by hardware or may be implemented by hardware executing corresponding software. The hardware or the software includes one or more modules corresponding to the foregoing functions.

The memory may be a read-only memory (read-only memory, ROM), another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in an instruction or data structure form and that can be accessed by a computer.

Optionally, the memory and the processor in the foregoing embodiments may be physically independent units, or the memory and the processor may be integrated together.

In the embodiments of this application, "at least one" means one or more, and "a plurality of" means two or more. "At least one of the following items" or a similar expression thereof indicates any combination of these items, including a single item or any combination of a plurality of items. For example, at least one item of a, b, or c may represent: a, b, c, a-b, a-c, b-c, or a-b-c, where a, b, and c may be singular or plural.

A person of ordinary skill in the art may be aware that the units and algorithm steps described in the embodiments disclosed in this specification may be implemented by a combination of electronic hardware, computer software, and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed operating processes of the foregoing system, apparatus, and unit, refer to corresponding processes in the foregoing method embodiments, and details are not described herein again.

In a plurality of embodiments provided in this application, the disclosed system, apparatus and method may be implemented in other manners. For example, the described apparatus embodiments are merely examples. For example, the module division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method implemented by a communications apparatus and comprising:
   determining that first in-device coexistence (IDC) Interference adjustment information exists in the communications apparatus, wherein the first IDC interference adjustment information comprises:
      a first frequency and a first bandwidth at which the communications apparatus is interfered with by a first communications system of the communications apparatus in a second communications system of the communications apparatus when the first communications system is an interference source, wherein the first communications system is different from the second communications system; or
      a second frequency and a second bandwidth at which the communications apparatus is interfered with by the second communications system in the first communications system when the first communications system is an interfered source; and
   sending the first IDC interference adjustment information.

2. The method of claim 1, wherein the first frequency is a center frequency of the first bandwidth.

3. The method of claim 1, wherein the second communications system is a cellular communications system.

4. The method of claim 1, wherein the first communications system is a WI-FI communications system.

5. The method of claim 1, further comprising:
   determining that second IDC interference adjustment information exists in the communications apparatus, wherein the second IDC interference adjustment information comprises port information indicating that the communications apparatus interferes with, in the first communications system, a transmit antenna of the second communications system; and
   sending the second IDC interference adjustment information.

6. The method of claim 1, wherein the communications apparatus comprises a user equipment (UE) or a chip in the UE.

7. A method comprising:
   receiving first in-device coexistence (IDC) interference adjustment information from a communications apparatus, wherein the first IDC interference adjustment information comprises:
      a first frequency and a first bandwidth at which the communications apparatus is interfered with by a first communications system of the communications apparatus in a second communications system of the communications apparatus, wherein the first communications system is different from the second communications system; or
      a second frequency and a second bandwidth at which the communications apparatus is interfered with by the second communications system in the first communications system; and
   performing an IDC interference adjustment based on the first IDC interference adjustment information.

8. The method of claim 7, wherein the first frequency is a first center frequency of the first bandwidth or the second frequency is a second center frequency of the second bandwidth.

9. The method of claim 7, wherein the second communications system is a cellular communications system.

10. The method of claim 7, wherein the first communications system is a WI-FI communications system.

11. The method of claim 7, further comprising:
    switching, based on the first IDC interference adjustment information, a first transmit frequency and a third bandwidth in the first communications system to a third frequency and a fourth bandwidth that are not interfered with by the second communications system; or
    switching, based on the first IDC interference adjustment information, an uplink bandwidth part (BWP) of the communications apparatus in the first communications system to a second transmit frequency and a fifth bandwidth that do not interfere with the second communications system; or
    decreasing a transmit power of the first communications system based on the first IDC interference adjustment information.

12. The method of claim 7, further comprising:
    receiving second IDC interference adjustment information from the communications apparatus, wherein the second IDC interference adjustment information comprises at least one of:
       first port information indicating that the communications apparatus interferes with, in the first communications system, a transmit antenna of the communications apparatus in the second communications system;

second port information indicating that the communications apparatus does not interfere with, in the first communications system, the transmit antenna;

first uplink sounding reference signal (SRS) resource information indicating that the communications apparatus interferes with, in the first communications system, the transmit antenna; or second uplink SRS resource information indicating that the communications apparatus does not interfere with, in the first communications system, the transmit antenna; and determining the transmit antenna based on the second IDC interference adjustment information.

13. A communications apparatus comprising:

one or more memories configured to store instructions; and one or more processors coupled to the one or more memories and configured to execute the instructions to cause the communications apparatus to:

determine that first in-device coexistence (IDC) interference adjustment information exists in the communications apparatus, wherein the first IDC interference adjustment information comprises:

a first frequency and a first bandwidth at which the communications apparatus is interfered with by a first communications system of the communications apparatus in a second communications system of the communications apparatus when the first communications system is an interference source, wherein the first communications system is different from the second communications system; or a second frequency and a second bandwidth at which the communications apparatus is interfered with by the second communications system in the first communications system when the first communications system is an interfered source; and send the first IDC interference adjustment information.

14. The communications apparatus of claim 13, wherein the first frequency is a first center frequency of the first bandwidth or wherein the second frequency is a second center frequency of the second bandwidth.

15. The communications apparatus of claim 13, wherein the second communications system is a cellular communications system.

16. The communications apparatus of claim 13, wherein the first communications system is a WI-FI communications system.

17. The method of claim 1, wherein the second frequency is a center frequency of the second bandwidth.

18. The method of claim 1, further comprising:

determining that second IDC interference adjustment information exists in the communications apparatus, wherein the second IDC interference adjustment information comprises port information indicating that the communications apparatus does not interfere with, in the first communications system, a transmit antenna of the communications apparatus in the second communications system; and sending the second IDC interference adjustment information.

19. The method of claim 1, further comprising:

determining that second IDC interference adjustment information exists in the communications apparatus, wherein the second IDC interference adjustment information comprises uplink sounding reference signal (SRS) resource information indicating that the communications apparatus interferes with, in the first communications system, a transmit antenna of the communications apparatus in the second communications system; and sending the second IDC interference adjustment information.

20. The method of claim 1, further comprising:

determining that second IDC interference adjustment information exists in the communications apparatus, wherein the second IDC interference adjustment information comprises uplink sounding reference signal (SRS) resource information indicating that the communications apparatus does not interfere with, in the first communications system, a transmit antenna of the communications apparatus in the second communications system; and sending the second IDC interference adjustment information.

* * * * *